(12) United States Patent
Sato et al.

(10) Patent No.: US 8,380,985 B2
(45) Date of Patent: Feb. 19, 2013

(54) CERTIFICATE VALIDATION METHOD AND CERTIFICATE VALIDATION SERVER AND STORAGE MEDIUM

(75) Inventors: Akane Sato, Yokohama (JP); Takahiro Fujishiro, Yokohama (JP); Shingo Hane, Tokyo (JP); Yoko Hashimoto, Yokohama (JP); Masahiko Furuya, Machida (JP); Masami Ogawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 311 days.

(21) Appl. No.: 12/826,248

(22) Filed: Jun. 29, 2010

(65) Prior Publication Data

US 2011/0004763 A1 Jan. 6, 2011

(30) Foreign Application Priority Data

Jul. 1, 2009 (JP) ................................ 2009-156511

(51) Int. Cl.
*G06F 21/00* (2006.01)
(52) U.S. Cl. ....................................... 713/158; 713/155
(58) Field of Classification Search .................. 713/155, 713/156, 157, 158
See application file for complete search history.

(56) References Cited

U.S. PATENT DOCUMENTS

| | | | |
|---|---|---|---|
| 2004/0125959 A1* | 7/2004 | Beuque et al. | 380/279 |
| 2005/0081037 A1* | 4/2005 | Kumagai et al. | 713/175 |
| 2005/0154918 A1* | 7/2005 | Engberg | 713/201 |

FOREIGN PATENT DOCUMENTS

| | | |
|---|---|---|
| JP | 2002-072876 | 3/2002 |
| JP | 2002-163395 | 6/2002 |

OTHER PUBLICATIONS

"Internet X.509 Public Key Infrastructure Certification Path Building (RFC4158)" Sep. 2005.
"Internet X.509 Public Key Infrastructure Certificate and Certificate Revocation List (CRL) Profile (RFC5280)" May 2008.
"Delegated Path Validation and Delegated Path Discovery Protocol Requirements (RFC3379)" Sep. 2002.

* cited by examiner

*Primary Examiner* — Edward Zee
(74) *Attorney, Agent, or Firm* — McDermott Will & Emery LLP

(57) ABSTRACT

A certificate validation method for causing a certificate validation server to receive a certificate validation request from a given terminal device, build a certification path of from a first certificate authority (CA) to a second CA, perform validation of the certification path, and send a validation result to the terminal which issued the certificate validation request is disclosed. The validation server detects either a key update of any given CA or a compromise of the given CA, acquires a certificate of relevant CA and first certificate status information and second certificate status information, stores the acquired information in a storage unit or, alternatively, updates the information stored in the storage based on the acquired information, and performs the building of a certification path and validation of the certification path by use of the information of the storage unit.

15 Claims, 23 Drawing Sheets

FIG. 9

| ISSUER'S DN | NEXTUPDATE DESCRIPTION PRESENCE/ ABSENCE | CACHE USABILITY | | CACHE VALID PERIOD (HRS) | | CACHE VALID TIME LIMIT | |
|---|---|---|---|---|---|---|---|
| | | CA CERTIFICTE | EE CERTIFICTE | CA CERTIFICTE | EE CERTIFICTE | CA CERTIFICTE | EE CERTIFICTE |
| "CA2" | PRESENT | OK | OK | | | | Nextupdate |
| "CA5" | ABSENT | OK | OK | 48 | | | EVERYDAY 7AM |
| "CA9" | PRESENT | NG | NG | | | | - |
| default | ABSENT | NG | NG | | | | - |
| default | PRESENT | OK | NG | | | Nextupdate | - |

FIG. 10

| | 81 | 82 | 83 | 84 | 85 | 86 | 87 |
|---|---|---|---|---|---|---|---|
| | ISSUER'S DN | SERIAL NO. | OCSP RESPONDER ADDRESS | NEXT RESPONSE UPDATE TIME | RESPONSE REGISTRATION TIME | RESPONSE DATA | VALIDITY FLAG |
| 88 | "CA2" | 1 | http://ocsp.ca2.com | Dec. 4, 2008 18:00:00 GMT | Dec. 2, 2008 18:00:00 GMT | OCSP Response | 1 |
| 89 | "CA2" | 2 | http://ocsp.ca2.com | Dec. 3, 2008 19:20:00 GMT | Dec. 1, 2008 19:20:00 GMT | OCSP Response | 1 |
| 90 | "CA2" | 3 | http://ocsp.ca2.com | Dec. 3, 2008 19:25:00 GMT | Dec. 1, 2008 19:25:00 GMT | OCSP Response | 1 |
| 91 | "CA3" | 5 | http://ocsp.ca3.com | Dec. 4, 2008 10:00:00 GMT | Dec. 2, 2008 10:00:00 GMT | OCSP Response | 1 |
| 92 | "CA5" | 20 | http://ocsp.ca5.com | Dec. 4, 2008 01:00:00 GMT | Dec. 2, 2008 01:00:00 GMT | OCSP Response | 0 |
| 93 | "CA6" | 11 | http://ocsp.ca6.com | Dec. 4, 2008 01:00:00 GMT | Dec. 2, 2008 01:00:00 GMT | OCSP Response | 0 |

FIG. 11

| ISSUER'S DN | SERIAL NO. | OCSP RESPONDER ADDRESS | NEXT RESPONSE UPDATE TIME | RESPONSE CACHE TIME | RESPONSE DATA |
|---|---|---|---|---|---|
| "CA2" | 1 | http://ocsp.ca2.com | Dec. 4, 2008 18:00:00 GMT | Dec. 2, 2008 18:00:00 GMT | OCSP Response |
| "CA2" | 2 | http://ocsp.ca2.com | Dec. 3, 2008 19:20:00 GMT | Dec. 1, 2008 19:20:00 GMT | OCSP Response |
| "CA2" | 3 | http://ocsp.ca2.com | Dec. 3, 2008 19:25:00 GMT | Dec. 1, 2008 19:25:00 GMT | OCSP Response |
| "CA3" | 5 | http://ocsp.ca3.com | Dec. 4, 2008 10:00:00 GMT | Dec. 2, 2008 10:00:00 GMT | OCSP Response |

| ISSUER'S DN | SERIAL NO. | OCSP RESPONDER ADDRESS | NEXT RESPONSE UPDATE TIME | RESPONSE CACHE TIME | RESPONSE DATA |
|---|---|---|---|---|---|
| "CA5" | 20 | http://ocsp.ca5.com | Dec. 4, 2008 01:00:00 GMT | Dec. 2, 2008 01:00:00 GMT | OCSP Response |
| "CA6" | 11 | http://ocsp.ca6.com | Dec. 4, 2008 01:00:00 GMT | Dec. 2, 2008 01:00:00 GMT | OCSP Response |

CERTIFICATE VALIDATION METHOD AND CERTIFICATE VALIDATION SERVER AND STORAGE MEDIUM

BACKGROUND OF THE INVENTION

The present invention relates to a technique suitably adaptable for validation of certificates in public key infrastructure (PKI) environments.

Systems using PKI technologies, including government PKI (GKPI), are becoming more widely used in order to clarify the creator of an electronic document and also to guarantee that such electronic document is free from unauthorized alteration or falsification. In some PKI-based systems, an electronic document is applied digital signature using a key called the secret key, also known as private key, which is exclusively owned by a person who affixes such digital signature, i.e., the signer. Upon reception of the digitally signed electronic document, the signature is validated to make sure that this electronic document is not falsified in any way.

In applications under strict requirements for higher reliability, it is necessary, in order to perform the digital signature validation, to validate the digital signature by means of a public key that is contained in a public key certificate (simply referred to as "certificate" hereinafter) of the signer, which is issued by a certificate authority (CA), and also to check whether a certificate of the signer is a truly valid certificate for an entity or person who validates digital signatures, called the validator. To verify whether the signer's certificate is valid or invalid to the validator, it is required to perform specific processing operations which follow: (1) certification path building, and (2) certification path validation.

In the process of the (1) certification path building, a chain of certificates is established, which is a sequence of trusts of from a CA trusted by the validator, called the trust anchor (TA), up to a CA that has issued the certificate of a signer. This certificate chain is a queue of certificates, wherein the subject entity name of a certificate is identical to the issuer name of another certificate placed next to the certificate, and a key identifier of the subject entity of the certificate matches a key identifier of the issuer of the next certificate. The validator gives access to a repository of each CA for acquiring the certificate, thereby performing the above-stated verification. Especially in a PKI model with CAs of different domains being interconnected together, each of these CAs issues a mutual authentication certificate, called the cross-certificate, to another CA, and vice versa. Accordingly, when building a certification path covering a plurality of different domains, such as in the PKI model, the certificate chain contains therein a cross-certificate(s). Regarding certification path building methodology, a detailed description is found in Section 2 "Certification Path Building" of a document titled "Internet X.509 Public Key Infrastructure: Certification Path Building (RFC4158)", September 2005, (Relevant Literature #1).

In the above-stated (2) certification path validation processing, an attempt is made to ensure the validity of every certificate of the certificate chain within the certification path that was built by the (1) certification path building processing. To judge whether the certificate is revoked or not, there is used either a certificate revocation list (CRL) to be issued by CA or an online certificate status protocol (OCSP) responder. The validator uses CA certificate to perform the validation of a signature that is added to the CRL obtained by access to the repository of CA. Alternatively, the validator validates a digital signature being added to an OCSP response obtained by sending an OCSP request to OCSP responder, by using a certificate of the OCSP responder. In a case where any certificate is not added thereto, access is provided to the repository of CA to thereby acquire either CA certificate or OCSP responder certificate. Regarding a method of performing the certification path validation, this is discussed in detail in Section 6 "Certification Path Validation" of a document titled "Internet X.509 Public Key Infrastructure Certificate and Certificate Revocation List (CRL) Profile (RFC5280)" May 2008 (Relevant Literature #2).

Currently available certificate validation models include an end entity model for verification of the validity of a certificate by the validator per se, and a certificate validation server model using a certificate validation server which provides online the certificate validation functionality on behalf of the validator. Specifications of the certificate validation server model are described in "Delegated Path Validation and Delegated Path Discovery Protocol Requirements (RFC3379)," September 2002. (Relevant Literature #3).

When compared to the end entity model, the certificate validation server model offers its advantages which follow. First, it is possible to lessen a client's software program for certificate validation. This can be said because the certificate validation server model is free from the need for mounting on the client the certification path building function for building a certification path(s). Second, merely modifying the setup of the certificate validation server makes it possible to flexibly cope with any possible changes in system configuration because of the fact that the client trusts a decision result of the certificate validation server.

While the certificate validation server builds a certification path and acquires the CRL from CA, once at a time, whenever the certificate validation is performed, this approach is inferior in efficiency. In view of this fact, JP-A-2002-72876 (Relevant Literature #4) discloses therein a technique for speedup of the certificate validation processing by designing the certificate validation server to register the CRL and/or the certification path.

Additionally, JP-A-2002-163395 (Relevant Literature #5) discloses therein a technique for storing in a cache a certificate validation result obtained using the CRL and/or OCSP responder and for directly using, when it satisfies the server's predefined cache usage criteria, the stored validation result data as a validation result with no changes.

SUMMARY OF THE INVENTION

The certificate validation processing includes several operations, such as acquisition of certificates of a certificate chain, CRL acquisition, inquiry to OCSP responder, acquisition of a certificate for CRL validation, and acquisition of a certificate for OCSP responder validation. These operations require frequent access to an external network(s); so, these must be heavily-loaded and time-consuming tasks for the certificate validation server.

In the relevant literature #4, a certificate validation server is disclosed which has functions of registering the first obtained CRL and using this registered CRL in the process of certificate validation, thereby to eliminate the need for acquisition of CRL once per certificate validation processing. Unfortunately, this literature fails to disclose the function of registering an OCSP response to be provided from OCSP responder. This literature is also silent about the function of registering, for later use, either certificates of a certificate chain or a certificate for validation of the CRL and/or OCSP response, which was obtained in the process of certification path building. Accordingly, in cases where a certificate to be issued by CA which provides revocation information using the OCSP responder is contained in the certification path, the certificate validation server is required to send an inquiry to the OCSP responder once per certificate validation processing. This impairs the efficiency. Additionally, it is a must for the certificate validation server to give access to the repository of CA, once per certificate validation processing, to thereby obtain the certificates of the certificate chain which are necessary for certification path building processing and a certificate(s) used for the validation of CRL and/or OCSP response. This also deteriorates the efficiency.

In the relevant literature #5, there are disclosed both a function of caching a validation result of the certificate that was obtained using CRL and/or OCSP responder and a function of updating the cached validation result after the elapse of a cache validity time period, which was preset by a validator based on a certificate issuer, owner, certificate valid period, etc. However, in view of the fact that the cache valid period is set up by the validator's own decision, the once-cached certificate validation result can often become invalid prior to expiration of the cache valid period, due to the CA side causes, such as CA's key update, CA compromise and others. The technique taught by the relevant literature #5 lacks any means for detecting, in such case, the necessity of updating the cached certificate validation result. This poses a problem as to degradation of system security. Presumable examples of the CA-side causes are alteration of the CRL issuer and/or OCSP responder to a new CA due to update of the CA's key, and revocation of the corresponding CA's issued every certificate due to a compromise of CA.

This invention has been made in view of the above-stated problems, and its object is to provide a certificate validation method capable of effectively performing certificate validation processing in increased security and a validation server for implementation of the method along with a software program and storage media for storage of this program.

The certificate validation method incorporating the principles of this invention is for use with a certificate validation server which is connected to a network together with a plurality of terminal devices and a plurality of certificate authority (CA) entities, for enabling the validation server to receive a certificate validation request from a given terminal device via the network, for building a certification path of from a first CA to a second CA, for performing validation of the certification path, and for sending a validation result via the network to the terminal device which is a source of the certificate validation request. The certificate validation server performs a processing operation including the steps of detecting either a key update of a given CA or a compromise of the given CA, acquiring a certificate of a relevant CA, first certificate status information and second certificate status information, storing the acquired information in a storage unit or, alternatively, updating the information being presently stored in the storage unit based on the acquired information, and performing building of the certification path and validation of the certification path by use of the information of the storage unit. Upon execution of the processing for validation of the next and following certificates, the certificate validation server performs the certification path building and validation by using the information of the storage unit without having to send an inquiry to CA again. Thus, it becomes possible for the server to effectively perform the certificate validation processing. In addition, the certificate validation server is operative to detect either a key update of the given CA or a compromise of this CA and acquire the certificate of relevant CA along with the first certificate status information and second certificate status information. This acquired information is reflectable on the storage unit. Thus it is possible to safely perform the certificate validation processing.

The certificate validation server in accordance with this invention is the one that executes the certificate validation method stated supra.

The software program of this invention is the one that causes a computer(s) to perform the above-stated certificate validation method.

The recording medium of this invention is the one that stores therein the program in a computer-readable manner.

According to this invention, it is possible to provide the certificate validation method capable of effectively and safely performing certificate validation processing and a certificate validation server for implementation of the method along with a software program and storage media for use therewith.

Other objects, features and advantages of the invention will become apparent from the following description of the embodiments of the invention taken in conjunction with the accompanying drawings.

BRIEF DESCRIPTION OF THE DRAWINGS

FIG. 9 is a diagram showing a structure of a table being stored in a configuration data storage unit 410, with OCSP responder cache usage criteria contained therein.

FIG. 10 is a diagram showing a structure of a table storing therein OCSP response information, which is stored in an OCSP response holding unit 48.

FIG. 11 is a diagram showing another structure of the OCSP response information-storing table which is stored in the OCSP response holding unit 48.

DESCRIPTION OF THE EMBODIMENTS

Figure 1:
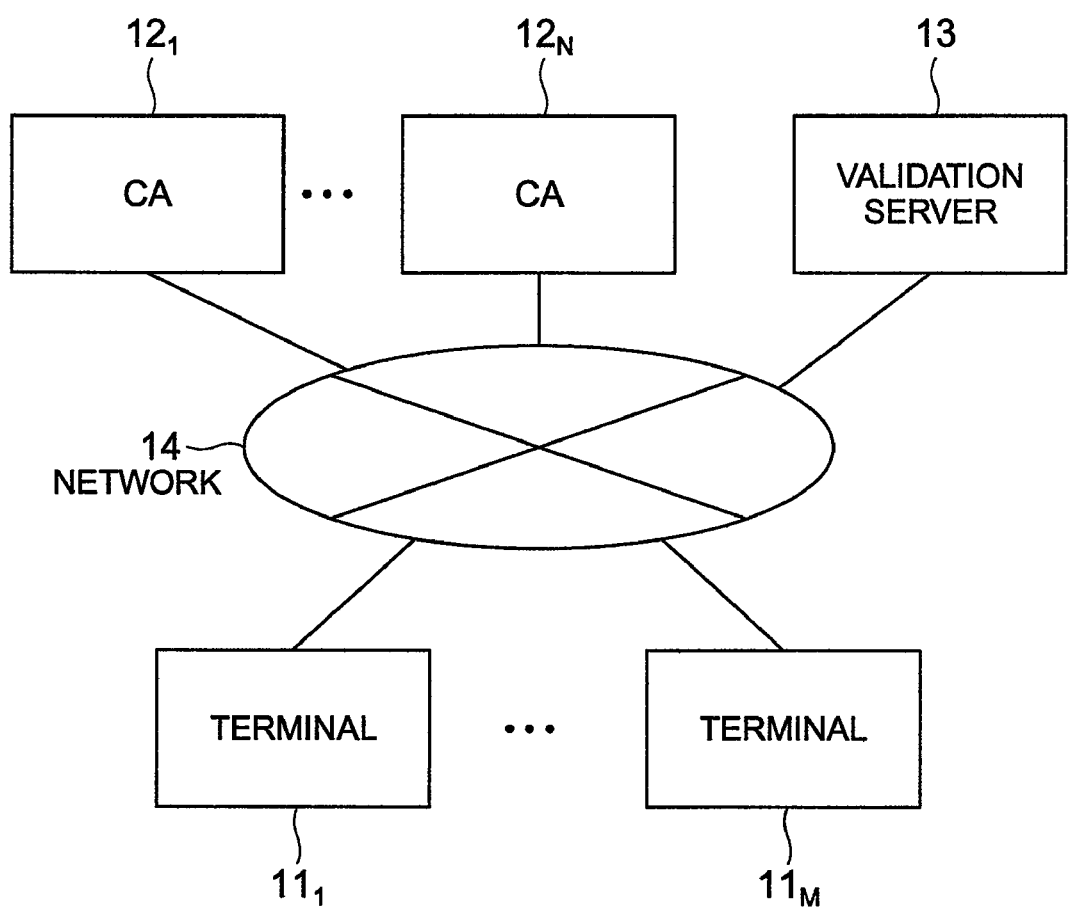
FIG. 1 is a diagram showing an overall configuration of a certificate validation system incorporating the principles of this invention.

Currently preferred embodiments of this invention will be described in detail with reference to the accompanying figures of the drawing below.

FIG. 1 is a diagram showing an entire configuration of a certificate validation system in accordance with one embodiment of this invention.

The certificate validation system embodying the invention is generally made up of a plurality of terminal devices $11_1$ to $11_M$ (collectively referred to as terminal equipment 11) which electronically perform procedures, certificate authority (CA) apparatuses $12_1$-$12_N$ (collectively referred to as CA 12) which perform services for issuance and revocation of certificates, a certificate validation server (referred to hereinafter as validation server) 13 which provides certificate revocation information, and a data communication network 14 for interconnection of respective ones of the system components 11-13, such as the Internet or the like.

An explanation will next be given of each device or apparatus constituting the certificate validation system of FIG. 1.

Figure 2:
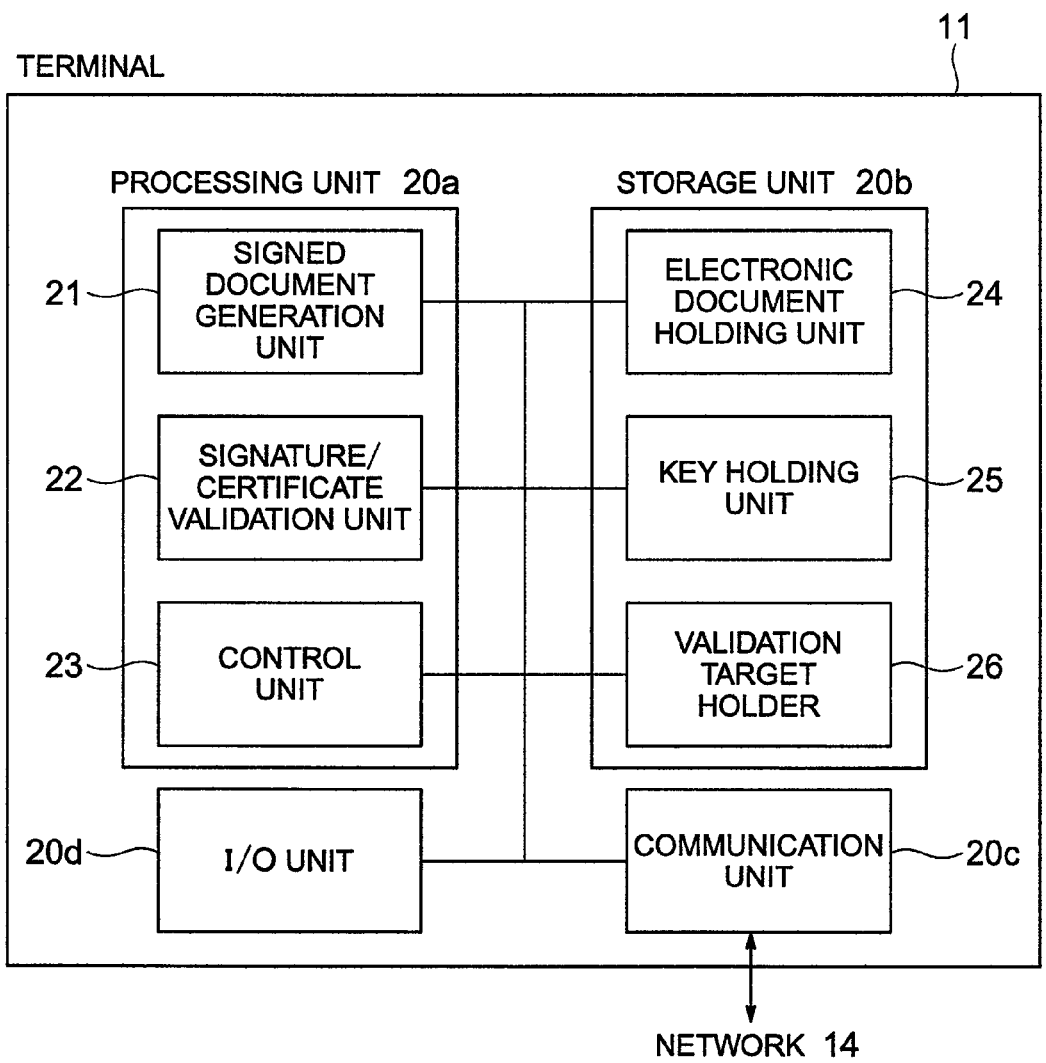
FIG. 2 is a diagram showing a configuration of a terminal equipment 11.

FIG. 2 is a diagram showing a configuration of the terminal device 11.

The terminal device 11 is arranged to have a processing unit 20a, storage unit 20b, communication unit 20c for making communications with other devices or apparatuses via the network 14, and input/output unit 20d which performs input/output of electronic documents prepared by users of the terminals 11 and/or electronic documents as received from other terminals 11 and also performs reception of instructions from the users.

The processing unit 20a includes a signed document generation unit 21 which adds a digital signature to an electronic document to thereby create a signed electronic document, a signature/certificate validation unit 22 for performing validation of signatures of signed electronic documents and certificates thereof, and a control unit 23 for overall control of respective parts of the terminal device 11.

The storage unit 20b has an electronic document holding unit 24 which holds therein electronic documents prepared by the users, a key holding unit 25 which retains a secret or private key used for generation of a digital signature and a certificate of a public key to be paired with the private key along with a certificate of a specific CA trusted by a user who uses this terminal device 11, and a validation target holding unit 26 which holds therein a digital signature-added or "signed" electronic document(s) as received from another terminal device 11 and a certificate(s) thereof.

In the configuration stated above, the control unit 23 receives from a user an instruction for transmitting via the input/output unit 20d to another user a certain electronic document which is held in the electronic document holding unit 24. Upon receipt of such user's instruction, the control unit 23 reads the electronic document out of the electronic document holding unit 24 and then passes it to the signed document generation unit 21. The signed document generation unit 21 uses the private key being held in the key holding unit 25 to generate an appropriate digital signature for the electronic document passed thereto. Then, the unit adds this generated signature to the passed electronic document, thereby creating a signed electronic document. The control unit 23 sends the signed electronic document created by the signed document generation unit 21 and its corresponding certificate held in the key holding unit 25 via the communication unit 20c to a destination terminal device 11 which is designated by the user.

When receiving a signed electronic document and its certificate from another terminal device 11 via the communication unit 20c, the control unit 23 causes the validation target holding unit 26 to save these document and certificate while letting them correlate with each other, and notifies the signature/certificate validation unit 22 of a request for validation of the document and certificate.

In responding to receipt of this validation request, the signature/certificate validation unit 22 validates the signed electronic document being saved in the validation target holding unit 26, by using the certificate which was received together with the signed electronic document. Then, the signature/certificate validation unit 22 saves the certificate that was used for the signature validation of the signed electronic document in the key holding unit 25 as a validation target certificate and performs validation using the CA certificate of the user's trusted CA. In this validation target certificate validating processing, the signature/certificate validation unit 22 performs several operations including validation of the signature of this validation target certificate, verification of non-expiration of its valid period, validation of other constraints, and verification of whether the validation target certificate is revoked or not.

In order to perform the verification of whether the validation target certificate is revoked or not, the signature/certificate validation unit 22 sends a validation request to the validation server 13. And, in a case where every validation is completed successfully and when receiving from the validation server 13 a validation result indicating that the certificate of interest is not revoked yet, the unit accepts the validity of the validation target certificate and regards the signed electronic document as a trustworthy or "legitimate" document; so, when the need arises, it outputs validation results of the signed electronic document and its certificate from the input/output unit 20d.

Figure 3:
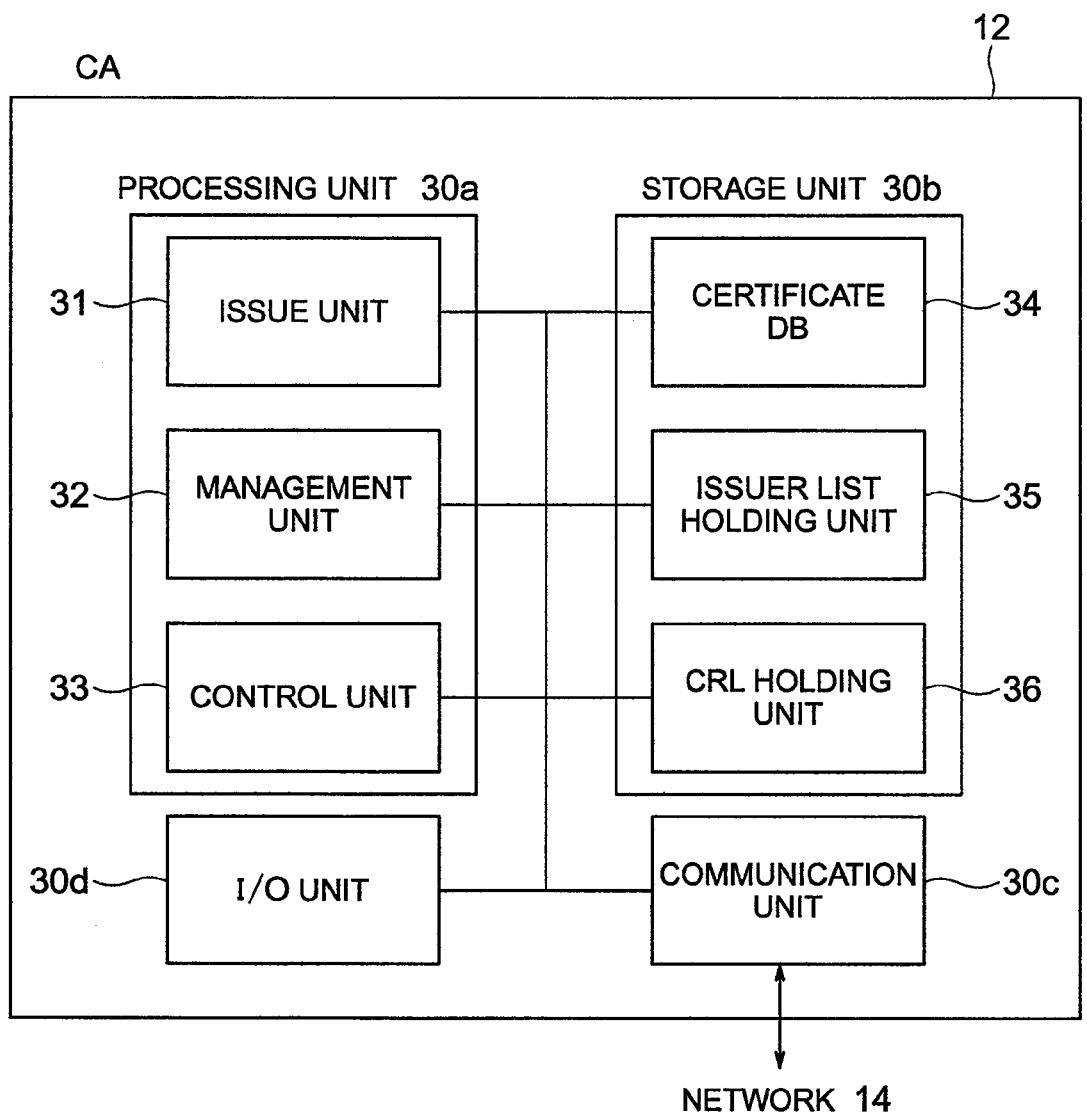
FIG. 3 is a diagram showing a configuration of a certificate authority (CA) apparatus 12 in the case of a certificate revocation list (CRL) being used to provide revocation information.
Figure 4:
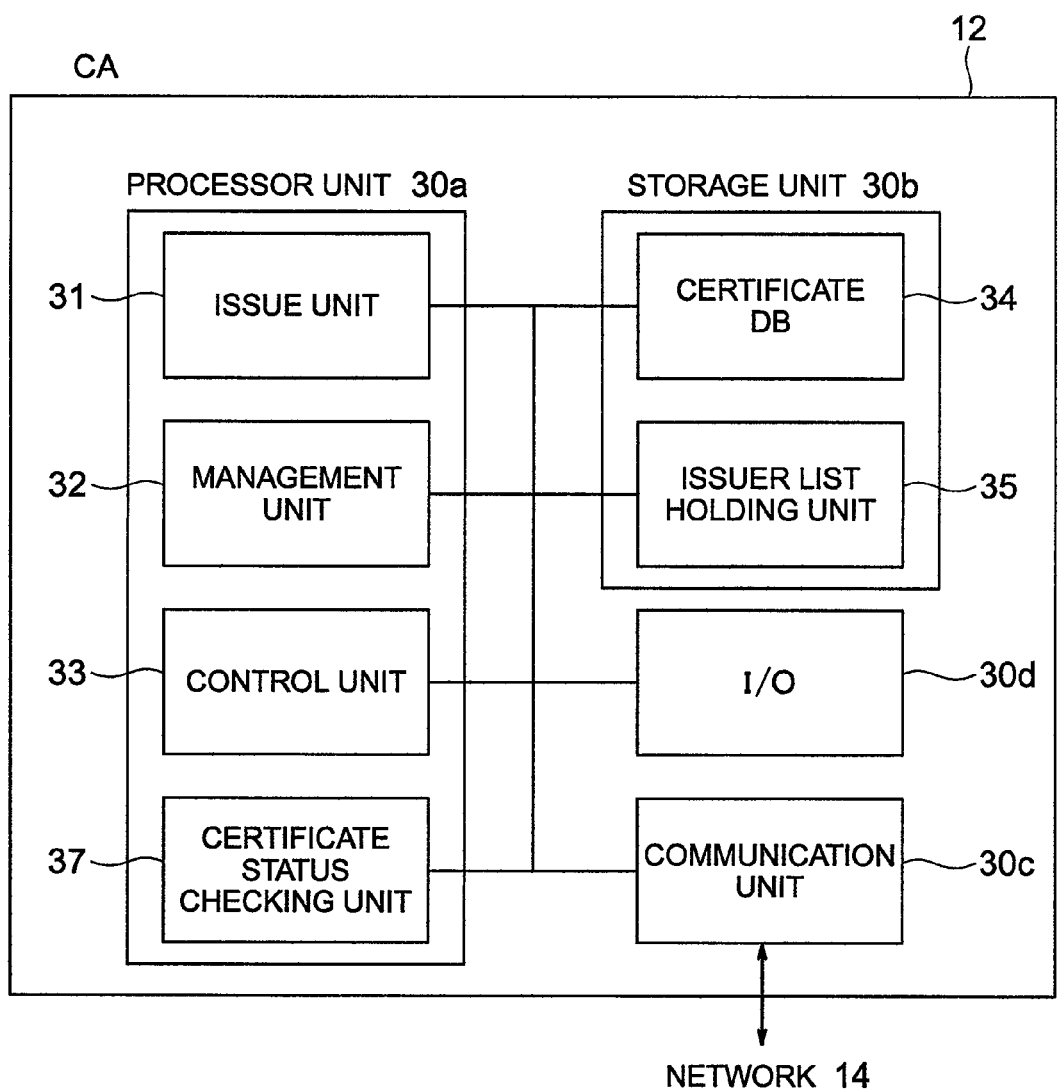
FIG. 4 is a diagram showing a configuration of CA 12 in the case of an online certificate status protocol (OCSP) responder being used to provide revocation information.

FIG. 3 is a diagram showing a configuration of the CA 12 in the case of providing revocation information by use of a certificate revocation list (CRL). FIG. 4 is a diagram showing a configuration of CA 12 in the case of providing the revocation information using an online certificate status protocol (OCSP) responder.

The CA 12 has a processing unit 30a, a storage unit 30b, a communication unit 30c for performing communications with other devices or apparatuses, and an input/output unit 30d for performing input/output of certificates or the like and reception of an instruction from an operator of the CA 12 along with the outputting of a processing result.

The processing unit 30a has an issue unit 31 which issues a certificate(s), a management unit 32 for performing management of the certificate issued by the issue unit 31, and a control unit 33 for total control of respective parts of the CA 12. Note here that the CA 12 shown in FIG. 4 also has a certificate status checking unit 37.

The storage unit 30b has a certificate database (DB) 34 which holds therein those certificates issued by the issue unit 31, a subject lists holding unit 35 which holds an issuance destination management list in which are recited the issuance source of each certificate that is held in the certificate DB 34, and a CRL holding unit 36, called the repository. Note that the CA 12 shown in FIG. 4 does not have the CRL holding unit 36.

In the above-stated arrangement, the control unit 33 is responsive to receipt of a certificate issuance request via either the input/output unit 30d or the communication unit 30c, for notifying the issue unit 31 of such content. In response to receipt of the request, the issue 31 creates a certificate corresponding thereto. In this case, the CA's private key is used to add a digital signature to the certificate thus prepared. Then, this certificate is passed via mail or over communication lines to the issuance request source entity by way of either the input/output unit 30d or the communication unit 30c. In addition, the control unit registers this certificate to the certificate DB 34 while at the same time writing the information of its issuance destination (i.e., issuance request sender) into an issuance-source management list that is saved in the issuer lists holding unit 35.

When receiving a certificate revocation request via either the input/output unit 30d or the communication unit 30c, the control unit 33 notifies the management unit 32 of such content. In responding thereto, the management unit 32 deletes the certificate under request for revocation from the certificate DB 34, and additionally writes a revocation status and revocation reason into the information of this certificate being held in the subject lists holding unit 35.

Then, the management unit 32 of the CA 12 shown in FIG. 3 periodically creates a certificate revocation list (CRL) in which are recited a serial number of the certificate that was deleted from the certificate DB 34 in response to the revocation request received, and saves this list in the CRL holding unit 36. Note that the CRL created contains several items as recited therein, including a serial number of the certificate that is revoked regardless of the fact that its validity period is not expired yet, a time and date of the occurrence of such certificate revocation, and a reason why the certificate was revoked. Further recited in the CRL is a scheduled time point by which the next CRL will be created, with a signature added thereto using the private key of the CA 12.

The control unit 33 of the CA 12 shown in FIG. 3 is responsive to receipt of a CRL acquisition request from another device via the communication unit 30c, for sending via the communication unit 30c the CRL held in the CRL holding unit 36 to the another device that has issued an inquiry.

Alternatively, the CA 12 shown in FIG. 4 operates in a way which follows: when receiving via the communication unit 30c from another device an OCSP request for inquiring certificate revocation information, the certificate status checking unit 37 prepares from the information of certificates held in the subject lists holding unit 35 an OCSP response indicative of whether the certificate of interest is revoked or not, and then sends this response to the inquiry-issued device via the communication unit 30c. In this OCSP response, a present status of the certificate is recited, with a signature added thereto using any one of the secret or private key of the CA 12 and the private key of OCSP responder.

Figure 5:
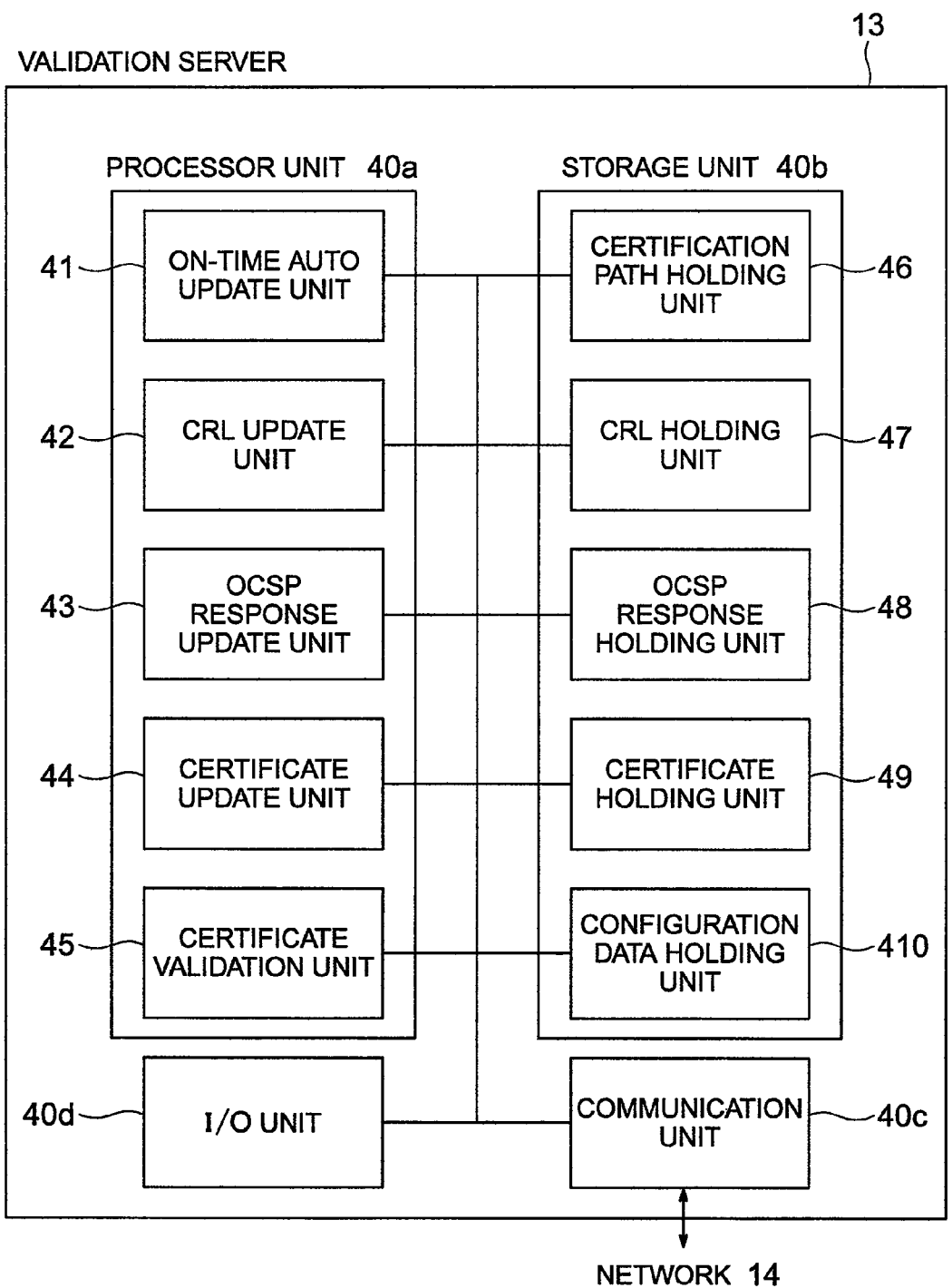
FIG. 5 is a diagram showing a configuration of a certificate validation server 13.

FIG. 5 is a diagram showing a configuration of the validation server 13 of FIG. 1.

The certificate validation server 13 includes a processing unit 40a, a storage unit 40b, a communication unit 40c for communication with other devices or equipments via the network 14, and an input/output unit 40d which performs input/output of a certificate(s) or else and reception of an instruction(s) from an operator of the validation server 13.

The processing unit 40a has a periodical automatic updating unit 41, CRL update unit 42, OCSP response update unit 43, certificate update unit 44 and certificate validation unit 45.

The storage unit 40b has a certification path holding unit 46, CRL holding unit 47, OCSP response holding unit 48, certificate holding unit 49, and configuration data holding unit 410.

The periodic auto-update unit 41 gives notice to the CRL update unit 42 when a present time reaches either a time point for periodical update of the CRL stored in the CRL holding unit 47 or the next-scheduled update time and date as recited in CRL. Regarding the OCSP response stored in the OCSP response holding unit 48, when a present time reaches the next-scheduled update time, the periodic auto-update unit 41 notifies it to the OCSP response update unit 43. When a present time becomes a specific time for periodic update of the certificate stored in the certificate holding unit 49, the periodic auto-update unit 41 notifies it to the certificate update unit 44. The periodic update time points of the CRL and OCSP response are stored in the configuration data holding unit 410. The next update time of OCSP response is saved in the OCSP response holding unit 48 along with the OCSP response.

The OCSP response holding unit 48 is responsive to receipt of a notice from the periodic auto-update unit 41, for acquiring the latest version of CRL from the issuance source of this CRL and for updating the CRL being presently stored in the CRL holding unit 47. When receiving a CRL update notice from the certificate update unit 44, the CRL update unit 42 updates the CRL stored in the CRL holding unit 47.

Upon receipt of a notice from the periodic auto-update unit 41, the OCSP response update unit 43 provides access to the OCSP response holding 48 at an address of OCSP responder which is stored therein while being correlated with the OCSP response to thereby acquire the latest OCSP response, and then updates the information of OCSP response stored in the OCSP response holding unit 48. Note here that a time interval for update of the OCSP response is set up by the operator of the validation server 13 via the input/output unit 40d on a per-CA basis and stored in the configuration data holding unit 410. The OCSP response update unit 43 is also responsive to receipt of an OCSP response update notice from the certificate update unit 44, for updating the OCSP response stored in the OCSP response holding unit 48.

Upon reception of a notice from the periodic auto-update unit 41, the certificate update unit 44 acquires a certificate from the certificate DB 34 of the CA 12 that has issued the certificate of interest. In a case where this certificate has already been updated, the certificate update unit 44 updates the certificate stored in the certificate holding unit 49. Alternatively, in case the valid period of this certificate is expired or this certificate is revoked, the certificate update unit 44 deletes the certificate stored in the certificate holding unit 49. In addition, the certificate update unit 44 is responsive to receipt of a certificate update notice from the certificate validation unit 45, for updating the certificate stored in the certificate holding unit 49 and also for sending a CRL update notice and OCSP response update notice to the CRL update unit 42 and OCSP response update unit 43, respectively.

Upon receipt of a certificate validation request from a terminal device 11 via the communication unit 40c, the certificate validation unit 45 uses the certification path stored in the certification path holding unit 46 and the CRL stored in the CRL holding unit 47 along with the OCSP response stored in the OCSP response holding unit 48 and the certificate saved in the certificate holding unit 49 to build, from the certificate of a target subject to be validated, an appropriate certification path up to a trust anchor (TA) of the validator, thereby to verify the validity of those certificates existing in the certification path in a sequential order. The certificate validation unit 45 also operates to send a validation result of a certificate with the signature of the validation server 13 added thereto toward the terminal device 11 of the certificate validation request source via the communication unit 40c.

Figure 6:
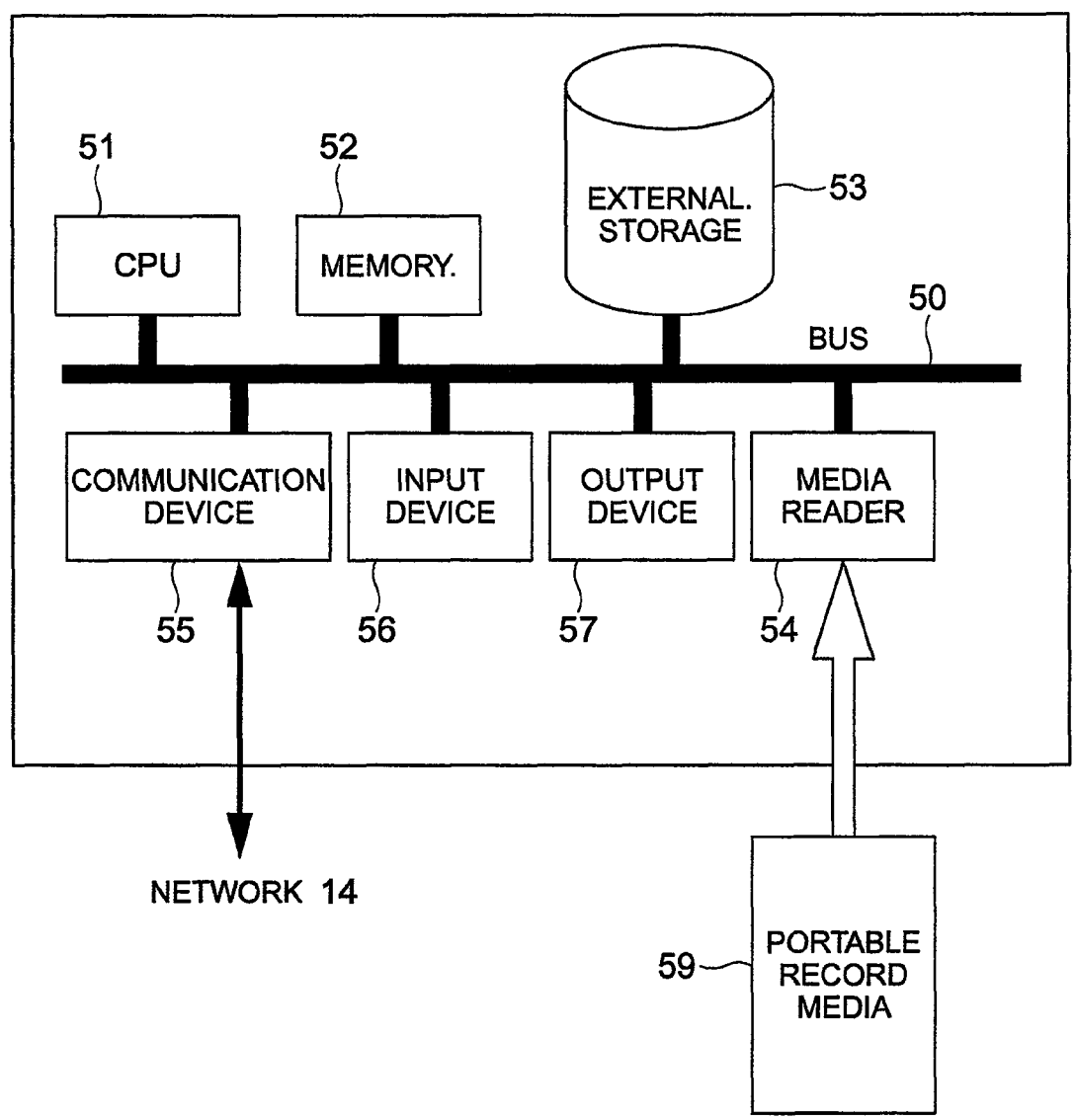
FIG. 6 is a diagram showing a hardware implementation example of each of the terminal equipment 11, CA 12 and certificate validation server 13.

It should be noted that each of the terminal device 11, CA 12 and validation server 13 shown in FIGS. 2 to 5 is actually implementable on a currently available standard computer. An example of this computer is shown in FIG. 6. As shown herein, the computer is generally made up of a central processing unit (CPU) 51, a semiconductor memory 52, an external storage device 53 such as a hard disk drive (HDD) or the like, a reader device 54 which reads data or information out of a hand-carriable recording medium 59, such as a compact disc read only memory (CD-ROM) or else, a communication device 55 for performing communications with others via the network 14, an input device 56 such as a keyboard and/or a pointing device called the mouse, an output device 57 such as a monitor display and/or printer, and an internal communication line (e.g., data transfer bus) 50 for performing data transmission and reception between any two of these computer components.

Each of the above-stated processing units is functionally realizable by execution of a certain software program which is loaded onto the memory 52 from the external storage device 53 under control of the CPU 51. More specifically, the communication unit 20c, 30c, 40c is realizable by utilization of the communication device 55 by the CPU 51; the input/output unit 20d, 30d, 40d is realizable by use of the input device 56, output device and reader device 54 by CPU 51; and, the storage unit 20b, 30b, 40b is realizable by using the memory 52 and/or external storage device 53 by CPU 51. Additionally, the processing unit 20a, 30a, 40a is realized as a process of the CPU 51. The processing unit 20a, 30a, 40a may alternatively be achieved by a hardware configuration.

The above-stated software program may be prestored in the external storage device 53. Alternatively, this program may be stored in the computer-usable recording medium 59. In this case, the program is read therefrom by the reader 54 for installation to the external storage 53 when the need arises. Still alternatively, the program may be the one that is installed to the storage 53 after having opportunistically been downloaded from either a network which is a communication media usable by the above-stated computer or another device which is connected to the communication device 55 that uses a carrier wave propagating over the network.

Figure 7:
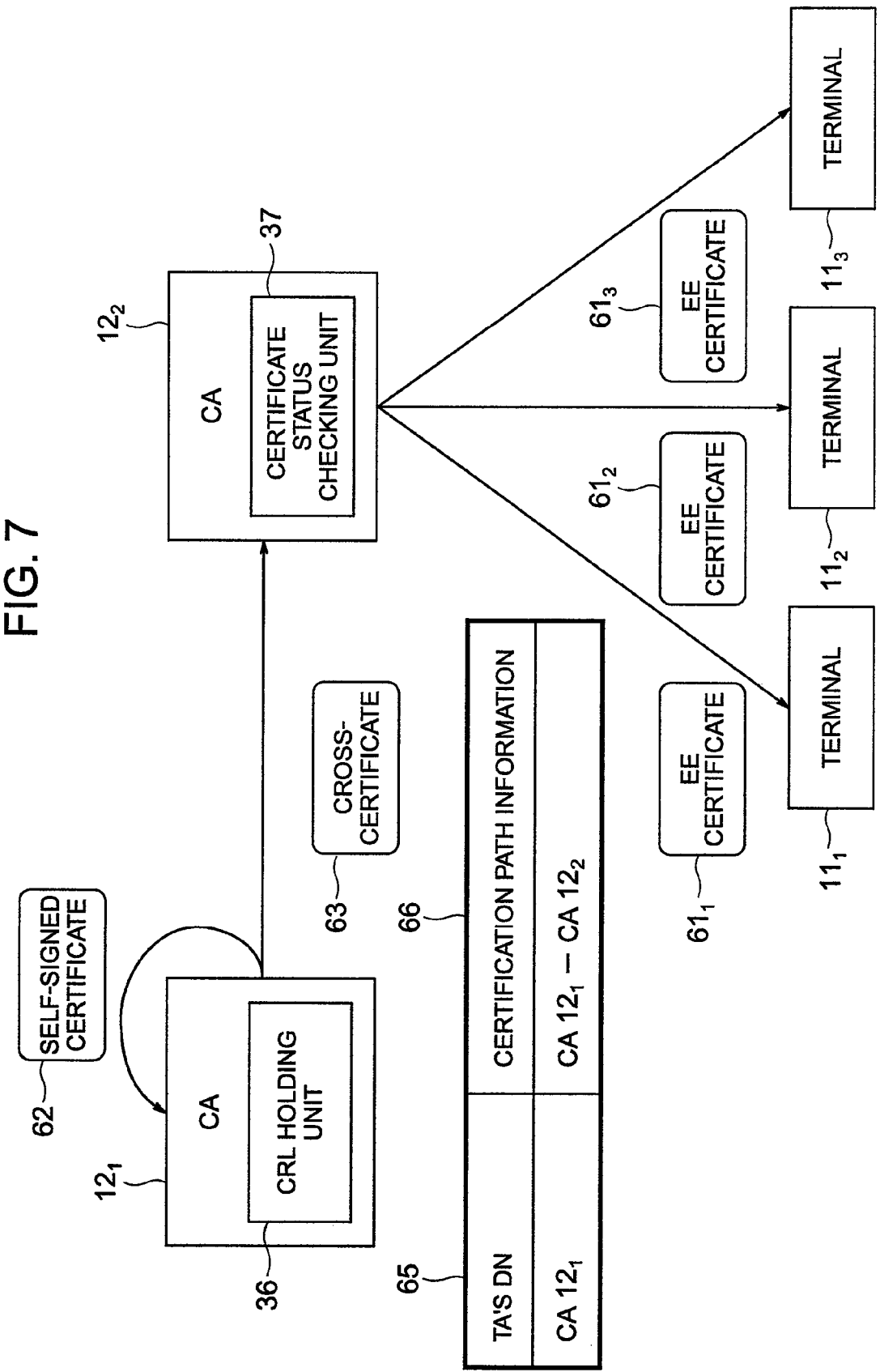
FIG. 7 is a diagram for explanation of the concepts of certification path building processing and certificate validation processing to be performed by the validation server 13.
Figure 8:
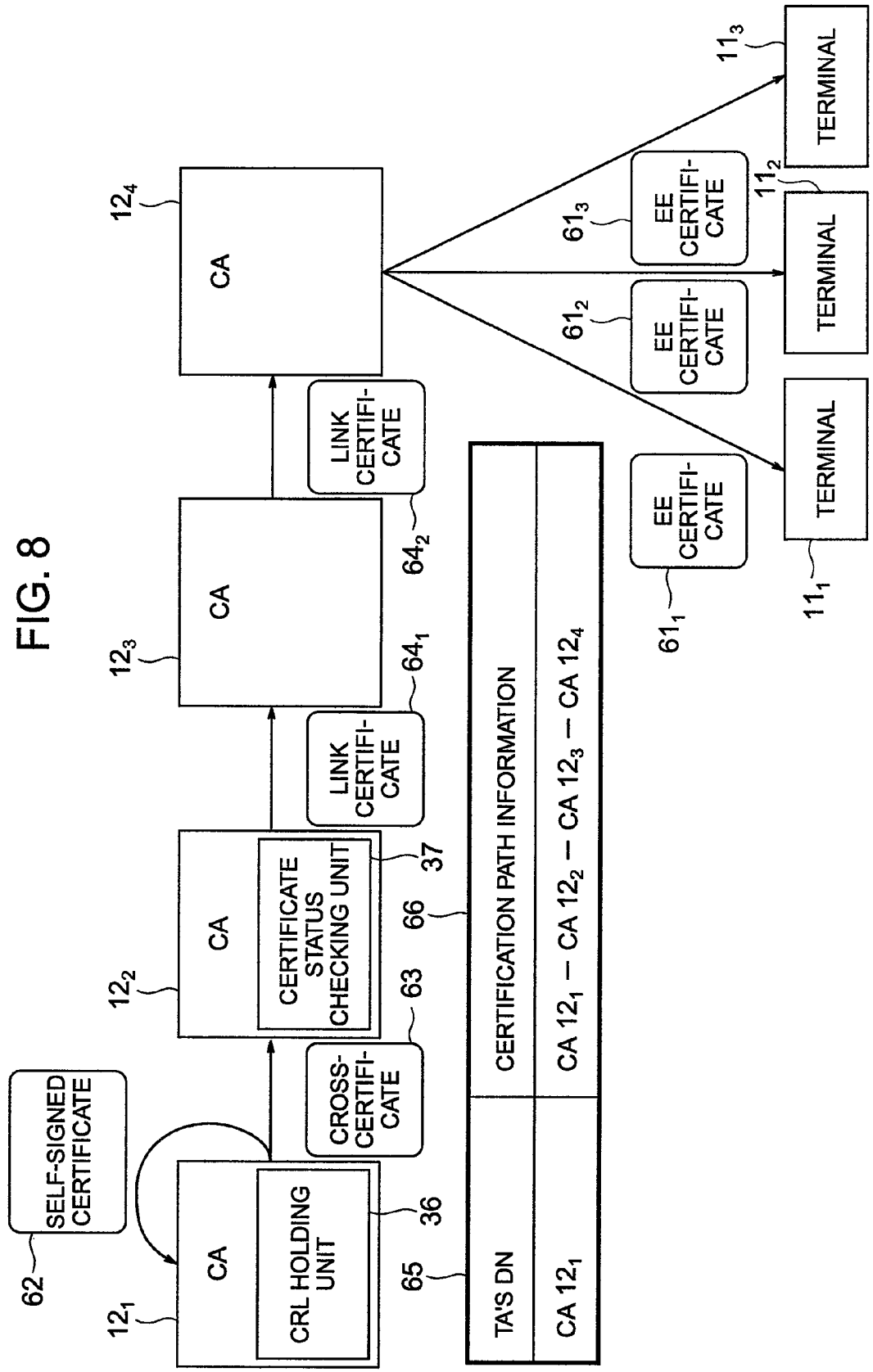
FIG. 8 is a diagram for explanation of the concepts of the certification path building processing and certificate validation processing to be performed by the validation server 13 in a case where the CA 12 updated its key.

FIGS. 7 and 8 are diagrams for explanation of concepts of the certification path building processing and certificate validation processing to be performed by the validation server 13. FIG. 8 depicts a model in the case where the CA 12 performed a key update operation.

In FIG. 7, the CA $12_1$ provides revocation information using a CRL and issues a mutual authentication certificate 63, also known as cross-certification, which is sent to another CA $12_2$, for example. Meanwhile, the CA $12_2$ uses an OCSP responder to provide revocation information and issues an end entity (EE) certificate $61_1$ to the terminal device $11_1$ while simultaneously issuing an EE certificate $61_2$ to terminal device $11_2$ and also issuing an EE certificate $61_3$ to terminal device $11_3$. Upon reception of a validation request of the EE certificate $61_1$ with a self-signed certificate 62 as trust anchor (TA), the validation server 13 gives access to the certificate DB 34 of the CA $12_1$, thereby building a certification path of from the TA up to the EE certificate $61_1$. A resultant certificate chain is as follows: "cross-certificate 63-EE certificate $61_1$". Next, in order to check whether the cross-certificate 63 is revoked or not, the validation server 13 acquires the CRL stored in the CRL holding unit 36 of CA $12_1$ to make sure that its corresponding serial number is present or absent in the CRL; simultaneously, in order to check whether the EE certificate $61_1$ is revoked or not, the validation server 13 sends an inquiry to the certificate status checking unit 37 of the CA $12_2$ for affirmation of a present certificate state and then performs validation of the certification path. Note here that this certification path thus built is stored in the certification path holding unit 46 after having recited the CA $12_1$ that is TA in a column 65 of distributed names (DNs) of TA and also having written "CA $12_1$-CA $12_2$" into a certification path information column 66 for the purposes of enabling the validation server 13 to offer manageability thereof.

In FIG. 8, the CA $12_1$ is similar to that of FIG. 7. On the other hand, the CA $12_2$ uses OCSP responder to provide the revocation information; in addition, it issues a link certificate $64_1$ as sent to a CA $12_3$ which is one generation prior to the CA $12_2$'s execution of key update while issuing a link certificate $64_2$ to a CA $12_4$ which is older by two generations than the CA $12_2$'s execution of key update. The CA $12_4$ issues the EE certificate $61_1$ to the terminal device $11_1$, issues EE certificate $61_2$ to the terminal $11_2$, and issues EE certificate $61_3$ to the terminal $11_3$. When the validation server 13 receives a request for validation of the validity of EE certificate $61_1$ with the self-signed certificate 62 as TA, the server 13 gives access to the certificate DB 34 of CA $12_1$ to thereby build a certification path of from the TA up to EE certificate $61_1$. The resulting certificate chain at this time is as follows: "cross-certificate 63 link certificate $64_1$ link certificate $64_2$, EE certificate $61_1$". Next, the validation server 13 checks whether each of the cross-certificate 63 and link certificates $64_1$ and $64_2$ is revoked or not; to do this, the server acquires the CRL stored in the CRL holding unit 36 of CA $12_1$ and ensures that its corresponding serial number is absent in the CRL. Simultaneously, in order to verify whether the EE certificate $61_1$ is revoked or not, the server 13 directs an inquiry to the certificate status checking unit 37 of CA $12_2$ for ascertainment of a present certificate state and then performs validation of the certification path. The certification path thus built is stored in the certification path holding unit 46 after having recited the CA $12_1$ that is TA in a "TA's DN" column 65 and also having written "CA $12_1$-CA $12_2$-CA $12_3$-CA $12_4$" into a certification path information column 66 for enabling the validation server 13 to have manageability thereof.

FIG. 9 is a diagram showing the structure of a table stored in the configuration data holding unit 410, with OCSP response cache usage criteria contained therein.

The DN of an issuer as recited in the certificate is stored in an issuer DN column 71 of the table. In a case where a time point at which the latest information as to the certificate status is next providable ("NextUpdate") is recited in an OCSP response which is issued by the CA 12 that is stored in the issuer DN column 71, "Present" is stored in a NextUpdate recitation presence/absence column 72; on the other hand, when no such recitation is found therein, "Absent" is written into the column 72. In another case where the cache usage is permitted of either the CA 12's issued CA certificate or EE certificate which is stored in the issuer DN column 71, "OK" is recited in a cache usability column 73; alternatively, in case such cache use is not granted, "NG" is written thereinto. In the case of "OK" being stored in the cache usability column 73, when updating the cache at fixed time intervals, the length of a time period in which the cache is rendered valid is stored in a column 74 of cache valid time, with respect to either the CA certificate or the EE certificate. In case "OK" is stored in the cache usability column 73, when updating the cache at a specific timing, a time limit by which the cache will be kept valid is saved in a cache validity period column 74 with respect to the CA certificate or EE certificate.

In the rows 76 to 710, cache usage criteria of the OCSP response to a certificate to be issued by the CA 12 are stored, respectively. A cache of CA certificate issued by the CA 12 which is stored in the row 76 will be updated within forty eight (48) hours since its registration whereas a cache of EE certificate will be updated when reaching the NextUpdate. A cache of CA certificate issued by the CA 12 which is stored in the row 77 will be updated within 48 hours since its registration, and a cache of EE certificate will be updated at 7 AM on a daily basis. The CA 12's issued CA certificate and EE certificate that are recited in the row 78 are not cached. In the row 79, there are recited criteria in case the nextUpdate is not written into OCSP response in those CAs 12 which are not stored in the issuer DN column 71. Recited in the row 710 are criteria in the case of the NextUpdate being written in OCSP response in CAs 12 that are not stored in the issuer DN column 71.

FIGS. 10 and 11 are diagrams each showing the structure of a table storing therein OCSP response information, which is stored in the OCSP response holding unit 48. In FIG. 10, there is shown a case where those lists with the certificate status of OCSP response being rendered valid are managed together by the same table; in FIG. 11, another case where such lists are managed by different tables is shown.

In an issuer DN column 81, DNs of issuers recited in certificates are described. In a serial number column 82, serial numbers of revocation-verified certificates are stored. In an OCSP responder address column 83, addresses of OCSP responders which have been inquired by the validation server 13 are stored. In a next response update time column 84, next-scheduled response update time points are stored, which have been calculated based on the OCSP response usage criteria shown in FIG. 9 and the contents of a response registration time column 85. In a response data column 86, OCSP response data responded by the CA 12 are stored. In a valid flag column 87, "1" or "0" is stored: "1" for a case where the status of a certificate recited in OCSP response is set to being valid; "0" for the other case where the certificate status is set to being invalid or is unknown. Note that the tables shown in FIG. 11 do not contain a valid flag column 87 shown in FIG. 10 for the reason which follows: management is done using different tables between when the certificate status is set to being valid and when this status is set to being invalid or is unknown.

Table rows 88 to 93 of FIG. 11 indicate examples with the caching of OCSP responses that are acquired when an inquiry is directed to each CA 12. The cache of OCSP response in reply to the certificate issued by CA 12, which is indicated in the row 88, 89, 90, is the one that was stored using the column 76 of FIG. 9 indicating the cache usage criteria. The cache of OCSP response with respect to the certificate issued by CA 12 as indicated in the row 91, 93 is the one that was stored using the use criteria of the column 79 or 710 because of the fact that any corresponding DN is absent in the issuer DN column 71 of FIG. 9. The cache of OCSP response in reply to the certificate issued by CA 12, which is in the row 92, is the one that was stored using the row 77 of FIG. 9.

Figure 12:
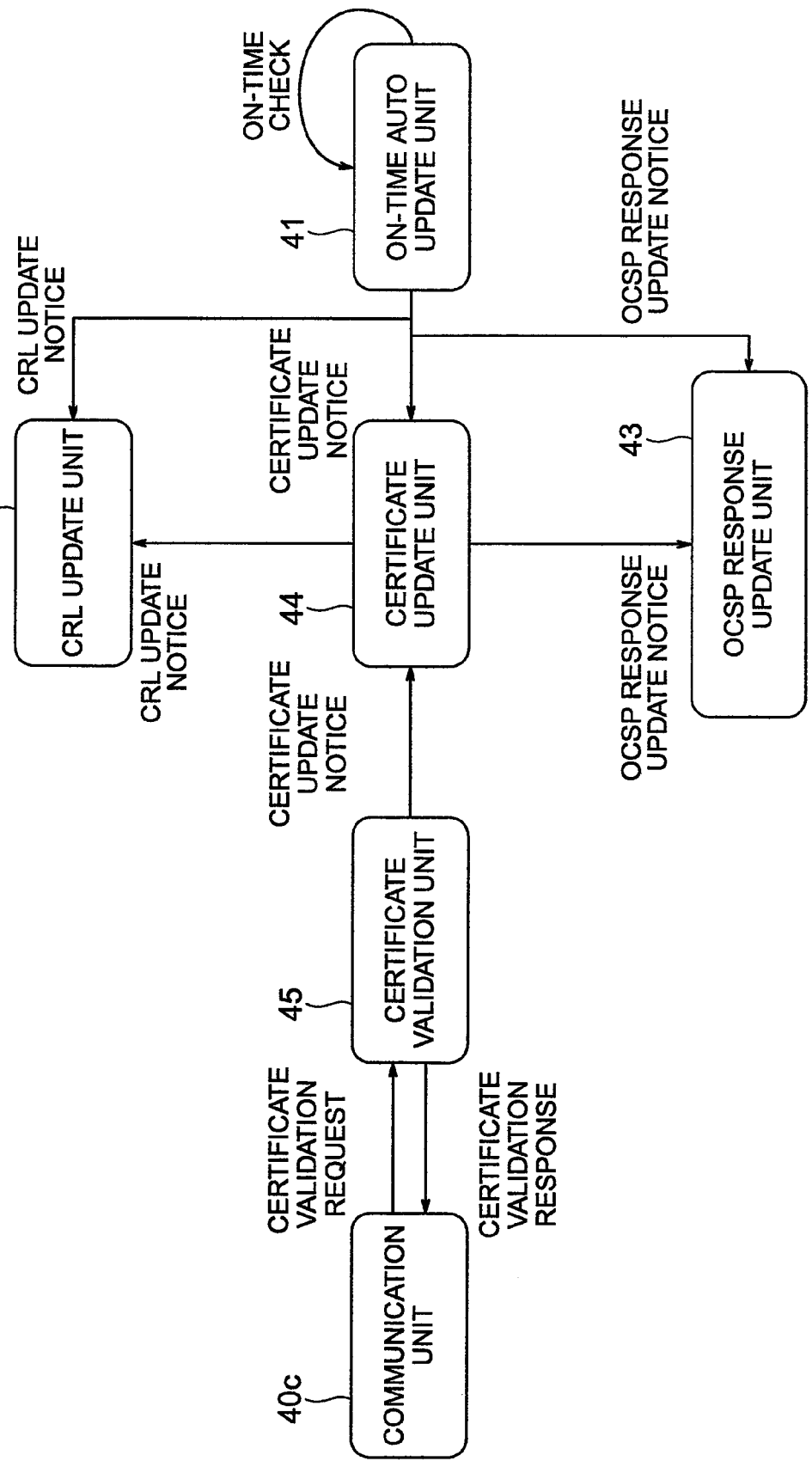
FIG. 12 is a diagram showing a relationship of several components of the validation server 13, including a communication unit 40c, periodical automatic updating unit 41, CRL update unit 42, OCSP response update unit 43, certificate update unit 44 and certificate validation unit 45.

FIG. 12 is a diagram for explanation of the relationship of the communication unit 40c, periodical automatic update unit 41, CRL update unit 42, OCSP response update unit 43, certificate update unit 44 and certificate validation unit 45 in the validation server 13. The communication unit 40c sends a certificate validation request to the certificate validation unit 45 and, thereafter, receives a certificate validation response from the certificate validation unit 45 that completed certificate validation processing in response to the certificate validation request. In the validation processing, when it is detected that the certificate held in the certificate holding unit 49 was subject to CA key update or any possible compromise, the certificate validation unit 45 sends a certificate update notice to the certificate update unit 44. The certificate update unit 44 is responsive to receipt of this certificate update notice, for supplying a CRL update notice and OCSP response update notice to the CRL update unit 42 and OCSP response update unit 43, respectively, in order to update the CRL and OCSP to be issued by the updated CA. When a present time reaches a time point for routine update of the CRL, OCSP response or certificate, the periodic auto-update unit 41 sends a CRL update notice to the CRL update unit 42, an OCSP response update notice to the OCSP response update unit 43, or a certificate update notice to the certificate update unit 44.

Figure 13:
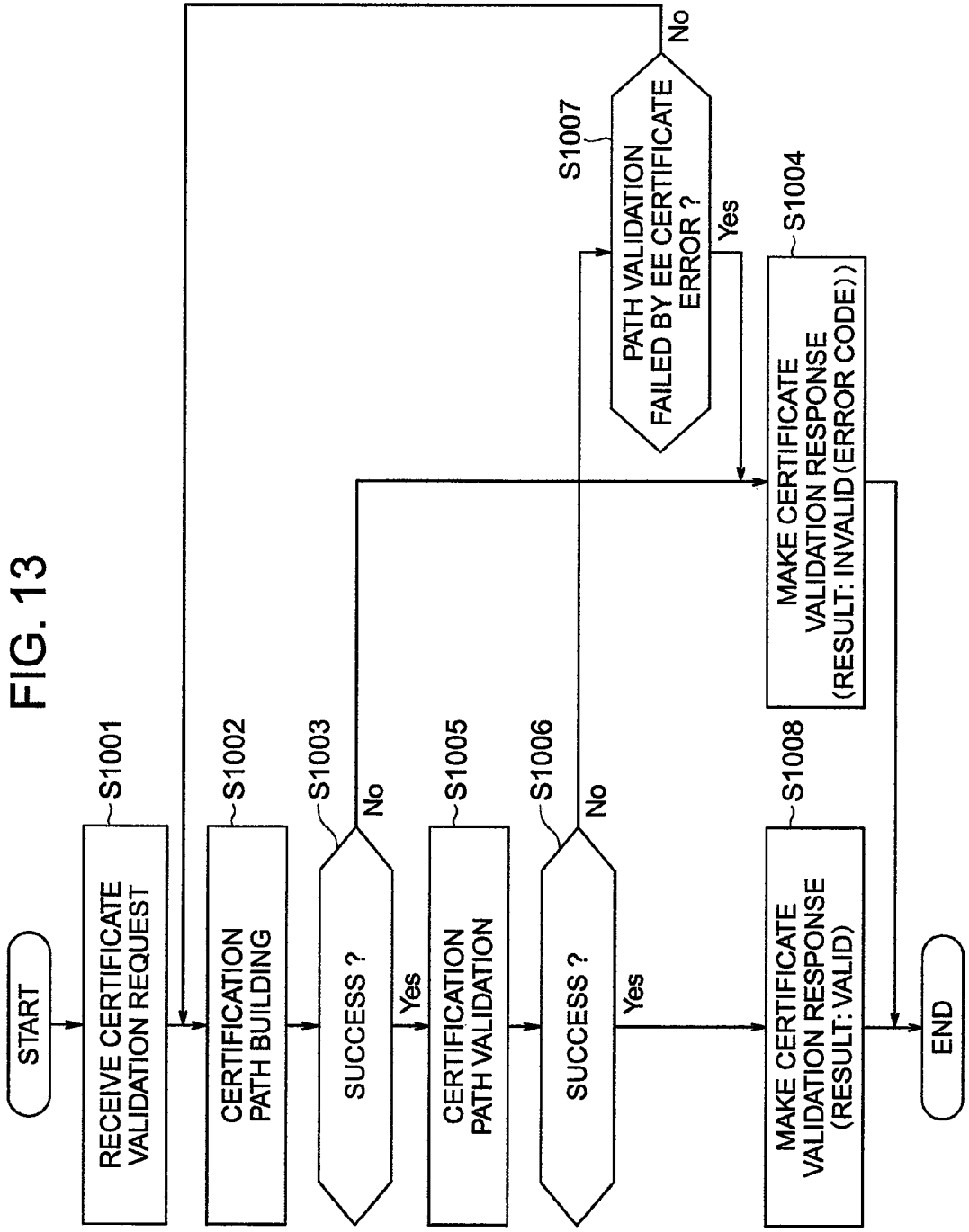
FIG. 13 is a flow chart of certificate validation processing to be performed by the certificate validation unit 45.

FIG. 13 is a flow chart of the certificate validation processing which is performed by the certificate validation unit 45.

Upon reception of a certificate validation request from the communication unit 40c, the certificate validation unit 45 extracts the issuer's DN from an EE certificate (i.e., certificate to be applied to the validation) contained in the certificate validation request, and extracts the subject entity's DN from a self-signed certificate of TA, which is the validator's trust point (at step S1001). Next, the certificate validation unit 45 builds a certification path of from the TA up to the issuer of EE certificate (at step S1002). Regarding the certification path building processing at step S1002, a detailed explanation thereof will be given later with reference to FIG. 14.

When the certification path building is failed (i.e., if "No" at step S1003), the certificate validation unit 45 adds an error code which was decided in the process of certification path building, thereby preparing a certificate validation response with a validation result indicating the lack of validity (at step S1004).

When the certification path building is completed successfully (i.e., if "Yes" at step S1003), the certificate validation unit 45 performs validation or "evaluation" of the certification path as built at step S1001 (at step S1005). Regarding the certification path validation processing at step S1005, its detailed explanation will be given later with reference to FIGS. 16, 17, 18 and 19.

When the certification path validation is failed (i.e., if No at step S1006), the certificate validation unit 45 determines, based on the error notice prepared in the process of the certification path validation, whether this certification path validation failure is caused by an EE certificate error, such as revocation of the EE certificate, signature fraudulence of EE certificate or the like (at step S1007). When the error of EE certificate is not the cause (i.e., if No at step S1007), the certificate validation unit 45 returns to the step S1002 in order to build a new certification path up to the EE certificate issuer from the same TA as that at step S1001. When the EE certificate error is the cause (i.e., if Yes at step S1007), the certificate validation unit 45 proceeds to step S1004.

When the certification path validation is completed successfully (i.e., if Yes at step S1006), the certificate validation unit 45 prepares a certificate validation response with a certificate validation result indicating the fact of being valid (at step S1008).

Figure 14:
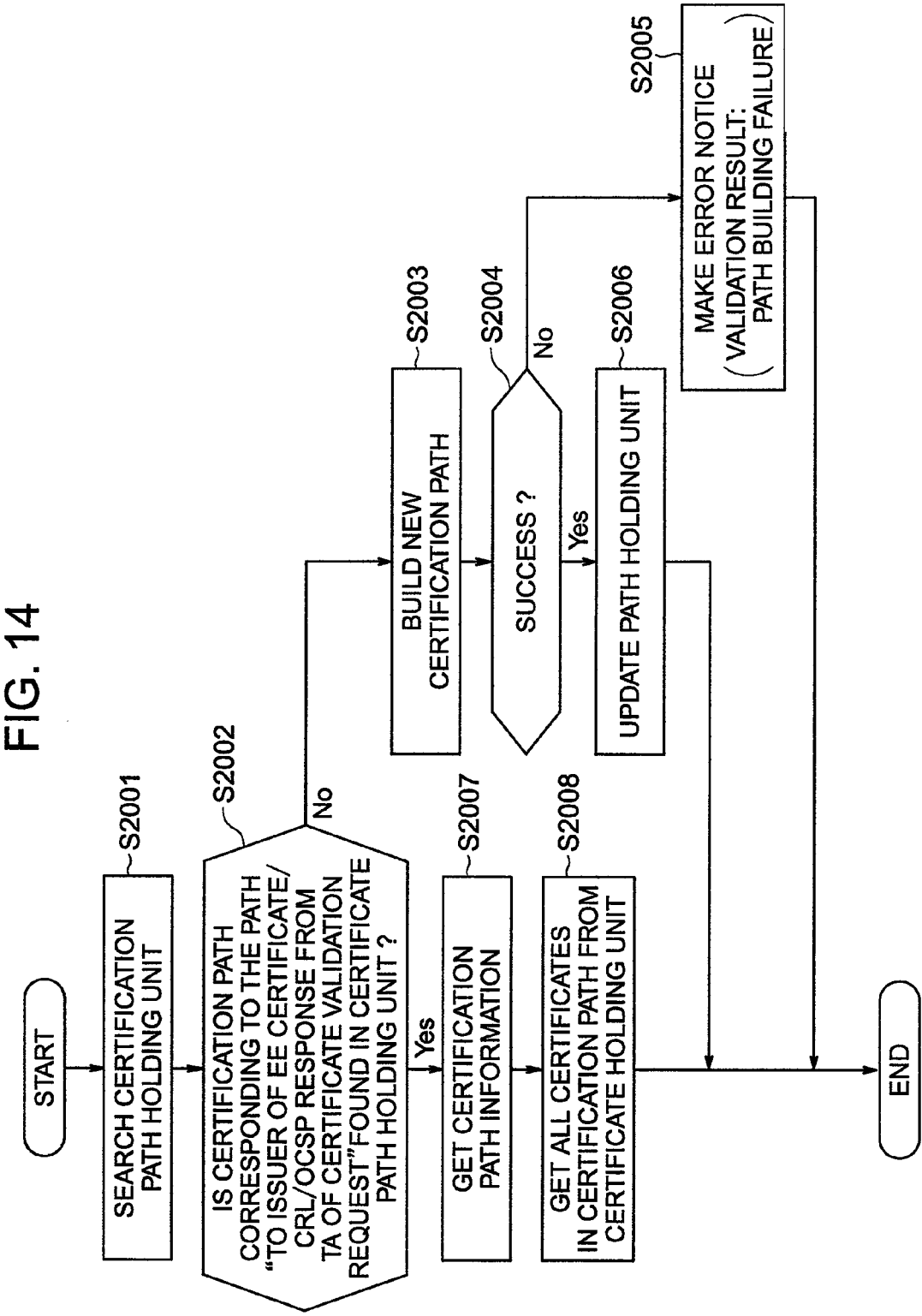
FIG. 14 is a flowchart showing details of certification path building processing (at step S1002 in FIG. 13) to be performed by the certificate validation unit 45.

FIG. 14 is a flowchart showing in detail the certification path building processing (step S1002 in FIG. 13) to be performed by the certificate validation unit 45.

The certificate validation unit 45 uses the DN of the TA that was extracted at step S1001 as a key to make searching through the contents of certification path holding unit 46 to thereby check whether there is a certification path of from the TA up to the issuer of the EE certificate, CRL or OCSP response (at step S2001). When any corresponding certification path is absent (i.e., if No at step S2002), the certificate validation unit 45 performs the building of a new certification path (step S2003). Regarding the new certification path building processing at step S2003, a detailed explanation thereof will be given later with reference to FIG. 15.

When the new certification path building is failed (i.e., if No at step S2004), the certificate validation unit 45 prepares an error report indicating that no certification paths are build due to the impossibility thereof (at step S2005).

When the new certification path building is completed successfully (i.e., if Yes at step S2004), the certificate validation unit 45 stores the information of such certification path as built at step S2003 in the certification path holding unit 46 (at step S2006).

Alternatively, when a corresponding certification path is found (i.e., if Yes at step S2002), the certificate validation unit 45 acquires its corresponding certification path information from the certification path holding unit 46 (at step S2007), and also obtains from the certificate holding unit 49 all available certificates in the certification path (step S2008).

Figure 15:
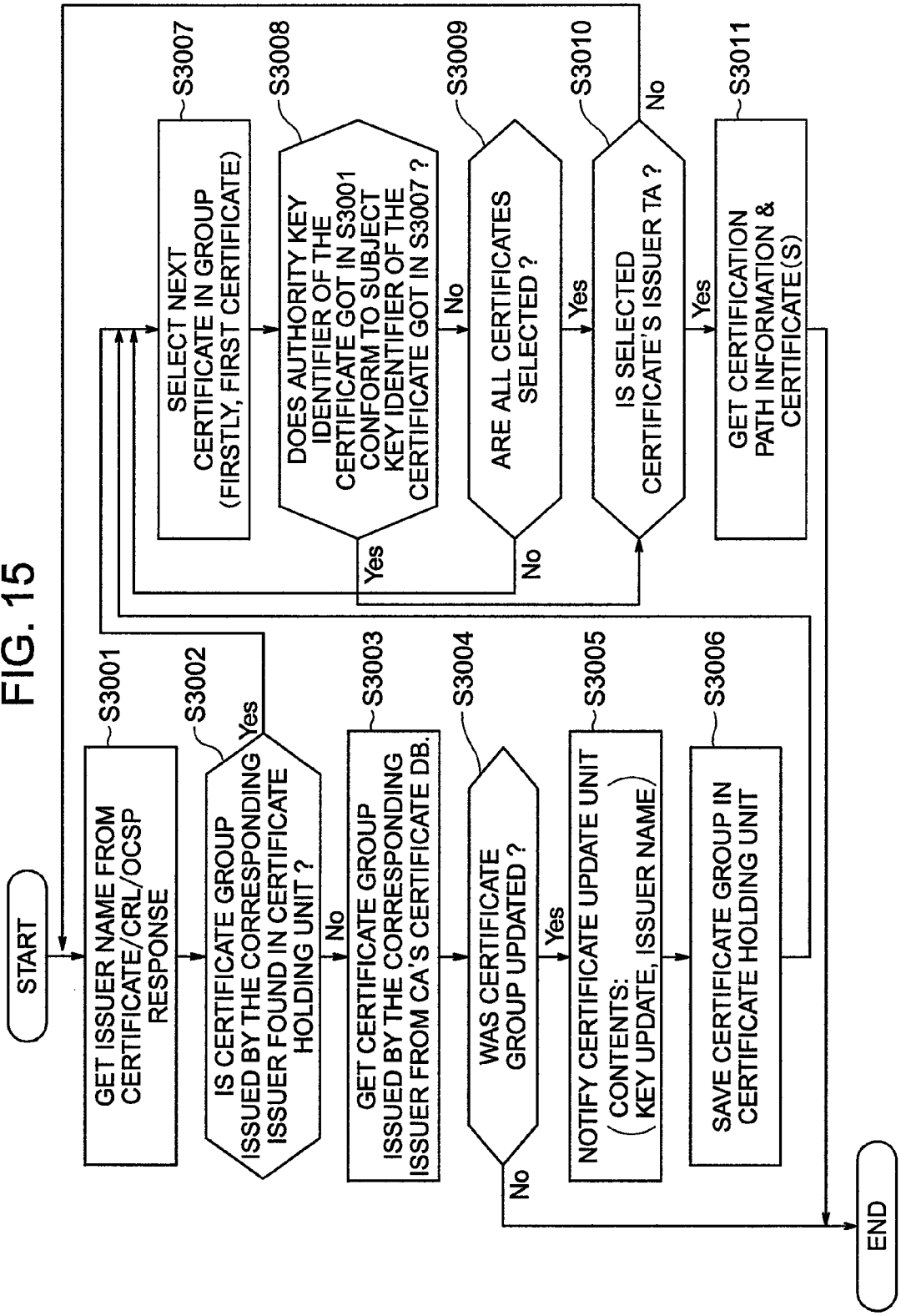
FIG. 15 is a flowchart showing details of new certification path building processing (at step S2003 of FIG. 14) to be performed by the certificate validation unit 45.

FIG. 15 is a flowchart showing in detail the new certification path building processing (step S2003 of FIG. 14) which is performed by the certificate validation unit 45.

The certificate validation unit 45 acquires the DN of the issuer of a certificate (at step S3001). Note here that for the first attempt only, the certificate validation unit 45 acquires the DN of the issuer of the EE certificate that was obtained at step S1001. Also note that in the case of building a new certification path for the purpose of CRL validation (at step S4010 in FIG. 17), the certificate validation unit 45 first acquires the DN of the issuer as recited in the CRL. In the case of performing the new certification path building in order to perform OCSP response validation (step S4016 in FIG. 18), the certificate validation unit 45 obtains the DN of the OCSP responder as recited in the OCSP response at the first attempt.

In case a certificate group issued by the issuer which was acquired at step S3001 (i.e., certificates with the type of certificate being set to CA certificate, which are saved in the certificate database (DB) 34 of the corresponding CA 12) is present in the certificate holding unit 49 unit (i.e., if Yes at step S3002), the certificate validation unit 45 goes to step S3007.

When such is absent in the certificate holding unit 49 (i.e., if No at step S3002), the certificate validation unit 45 provides access to the certificate DB 34 of the CA 12 of the issuer acquired at step S3001 to thereby obtain a certificate group (at step S3003).

The certificate validation unit 45 compares the certificate group which was acquired at step S3001 and which is presently saved in the certificate holding unit 49 to the certificate group obtained at step S3003. When no update is applied thereto (i.e., if No at step S3004), it is impossible to acquire the certificate for execution of the certification path building; so, it is judged that the new certification path building is failed, followed by termination of the processing. When update is done (i.e., if Yes at step S3004), the certificate validation unit 45 decides that the corresponding CA 12 has updated the key and thus sends to the certificate update unit 44 a report specifying the name of a corresponding issuer and indicating that key update has been done (at step S3005). Next, the certificate validation unit 45 saves the certificate group acquired at step S3003 in the certificate holding unit 49 (step S3006), and then proceeds to step S3007.

The certificate validation unit 45 selects the next certificate in the certificate group acquired at either the step S3002 or step S3003 (at step S3007). Note that if this is the first attempt of iterative processing, then it selects the first certificate of the certificate group.

In case a key identifier of the issuer of the certificate or CRL or OCSP response acquired at step S3001 is not consistent with a key identifier of the subject entity of the certificate that was selected at step S3007 (i.e., if No at step S3008), the certificate validation unit 45 proceeds to step S3009. If the former is identical to the latter (i.e., Yes at step S3008) then go to step S3010.

When all certificates of the certificate group are not selected yet (i.e., if No at step S3009), the certificate validation unit 45 returns to step S3007. When all of them are selected (i.e., if Yes at step S3009), the certificate validation unit 45 proceeds to step S3010.

The certificate validation unit 45 acquires the certificate as selected at step S3007 and, if the issuer of such certificate is the TA that was extracted at step S1001 (i.e., Yes at step S3010) then determine that the certification path building is completed successfully. The certificate validation unit 45 acquires all the certificates and certification path information acquired at step S3010 in the process of performing iterative processing (at step S3011). When it is not the TA (i.e., if No at step S3010), the certificate validation unit 45 returns to the step S3001.

Figure 16:
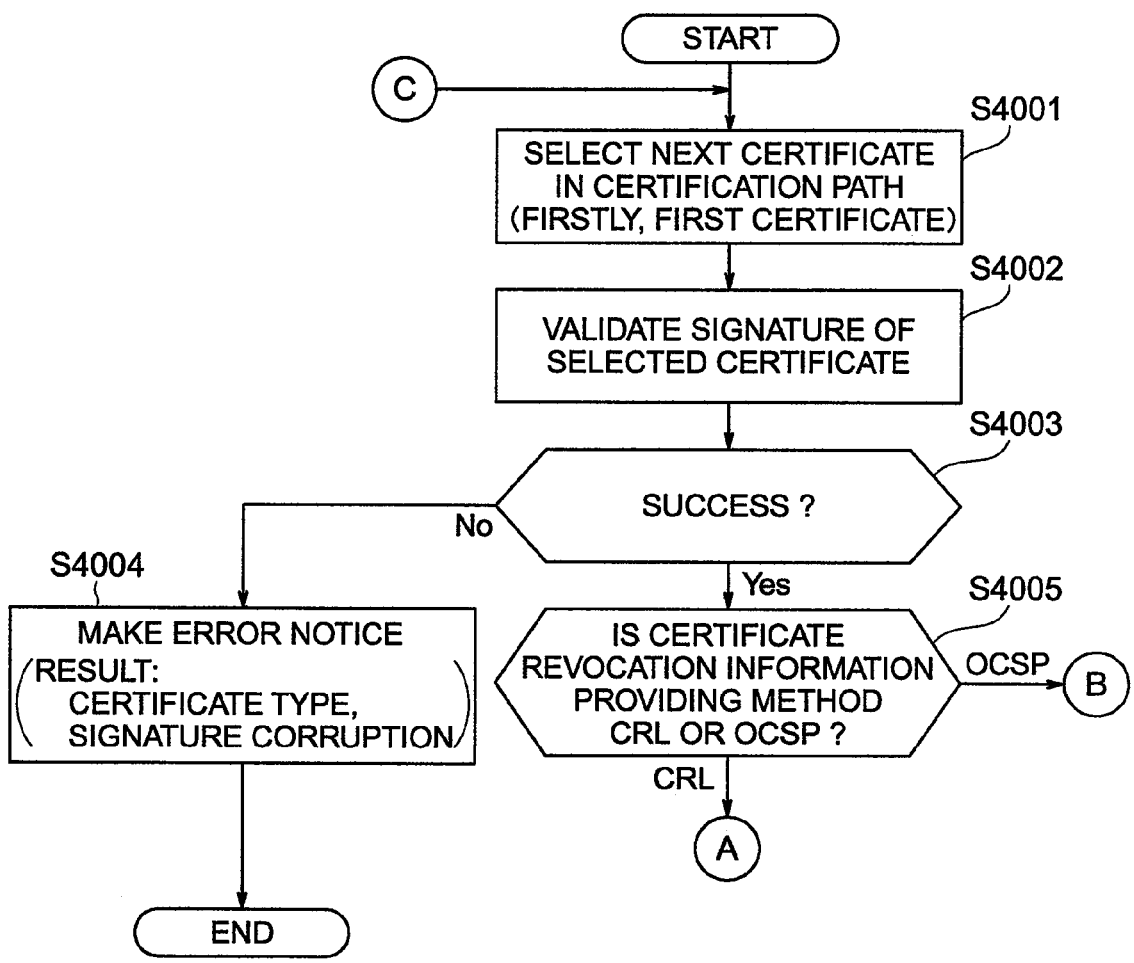
FIG. 16 is part of a flowchart showing details of certification path validation processing (at step S1005 of FIG. 13) to be performed by the certificate validation unit 45.
Figure 17:
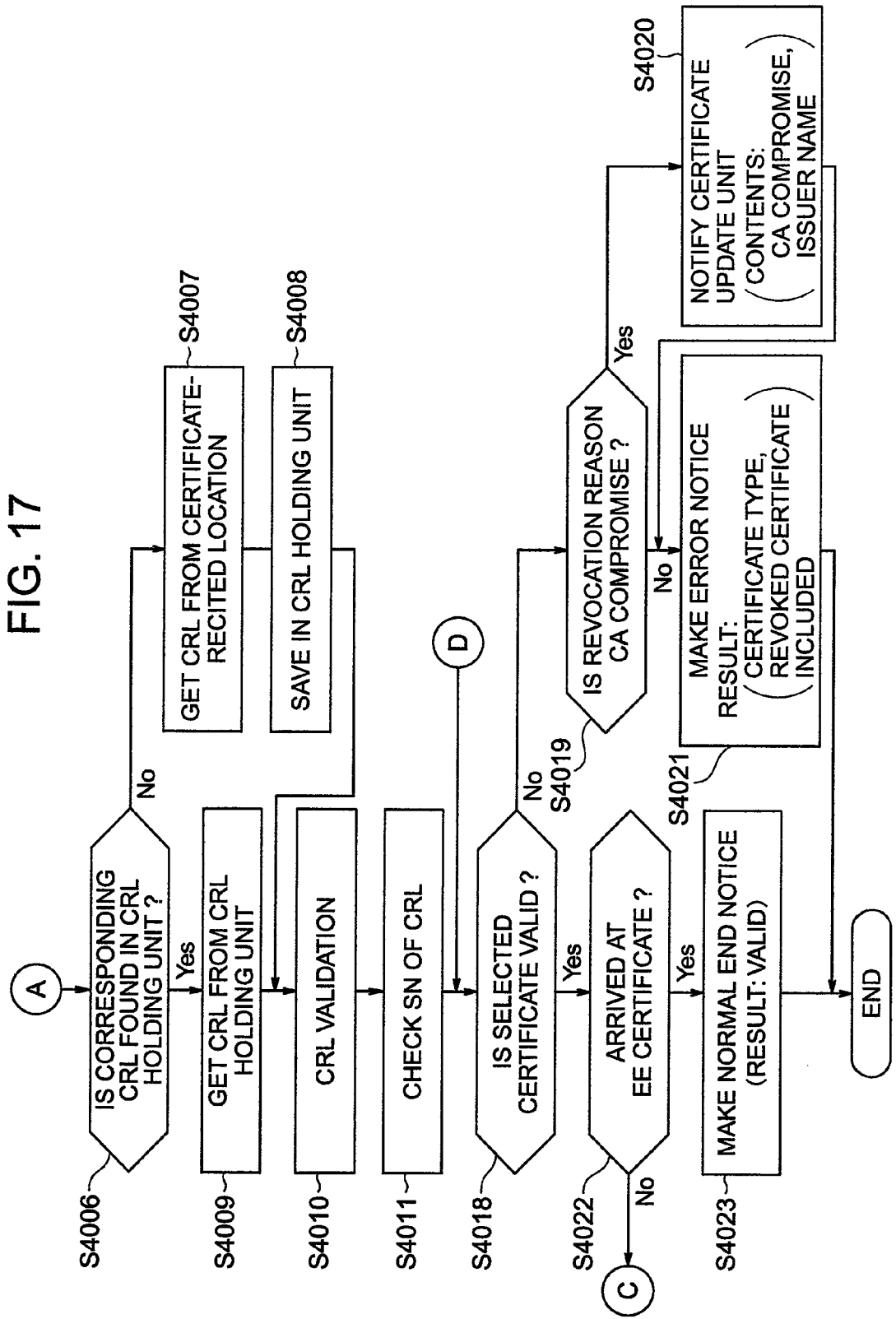
FIG. 17 is another part of flowchart showing details of the certification path validation processing (at step S1005 of FIG. 13) to be performed by the certificate validation unit 45.
Figure 18:
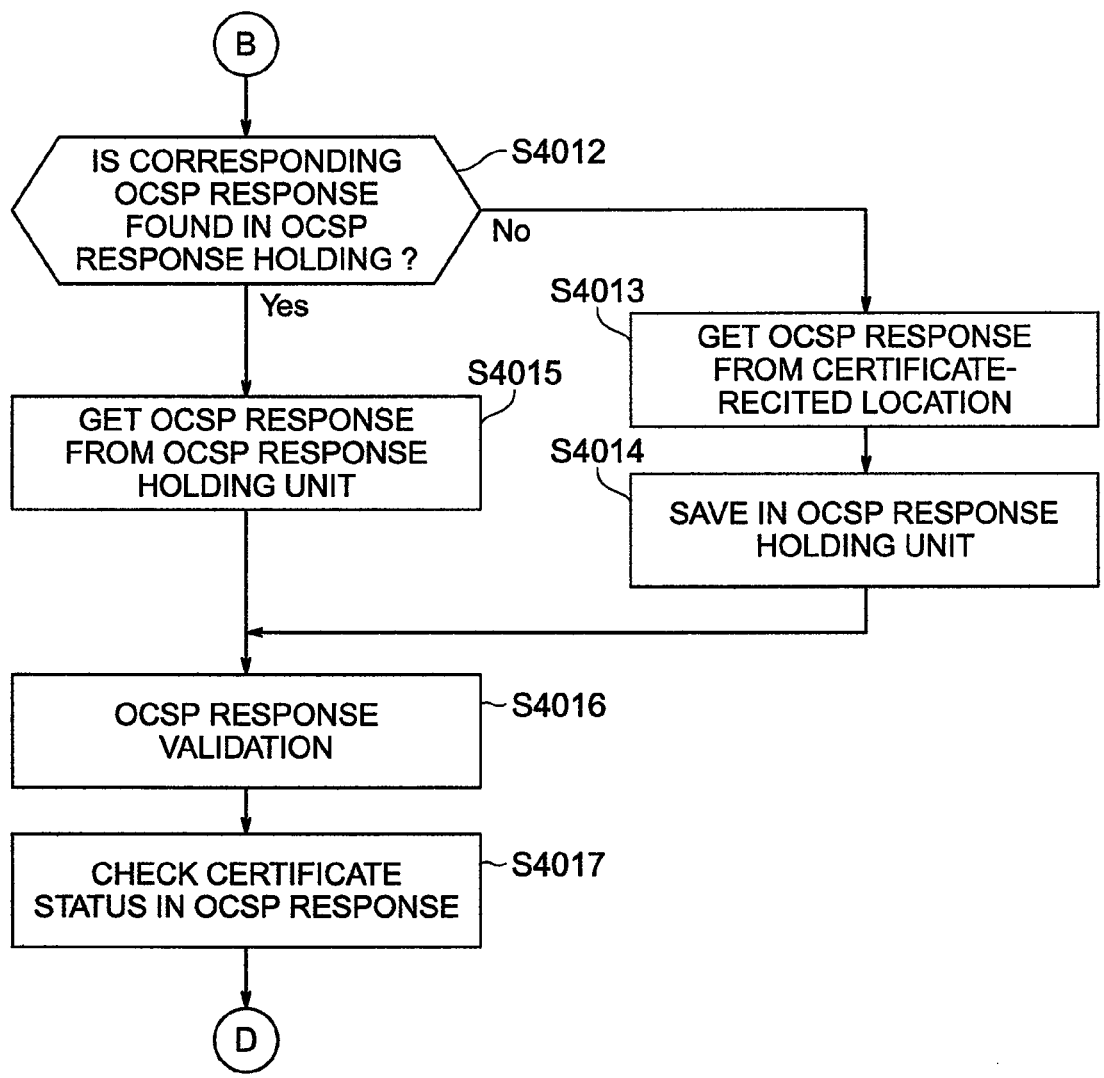
FIG. 18 is a remaining part of flowchart showing details of the certification path validation processing (step S1005 of FIG. 13) to be performed by the certificate validation unit 45.

Referring next to FIGS. 16, 17 and 18, these diagrams are a flowchart showing in detail the certification path validation processing (step S1005 of FIG. 13) to be performed by the certificate validation unit 45.

The certificate validation unit 45 selects the next certificate from among all the certificates of the certification path acquired at step S2008 (FIG. 14) or step S3011 (FIG. 15) in the order of from the TA's issued certificate to EE certificate (at step S4001). Note that the certificate validation unit 45 selects a primary certificate for the first time.

The certificate validation unit 45 performs signature validation of the selected certificate by its previous certificate in the certification path (at step S4002). Note that for the first time, the certificate validation unit 45 performs the signature validation using the self-signed certificate of TA which was acquired at step S1001.

In a case where the signature validation at step S4003 is failed (i.e., if No at step S4003), the certificate validation unit 45 prepares an error report specifying the type of an error-occurred certificate and indicating that an error of the validation processing must be caused by signature fraudulence (at step S4004). When the signature validation at step S4003 is succeeded (i.e., if Yes at step S4003), the certificate validation unit 45 proceeds to step S4005.

In case the certificate selected at step S4001 contains a revoked list distribution point as recited therein, the certificate validation unit 45 judges that a revoked information providing method is CRL (i.e., the answer as output at step S4005 is "CRL") and then goes to step S4006 shown in FIG. 17; alternatively, when there is a description of the location of OCSP responder in an authority information access region of the certificate, it decides that the revoked information providing method is OCSP (the answer as output at step S4005 is "OCSP") and then proceeds to step S4012 shown in FIG. 18.

In case the "CRL" answer is output at step S4005, the certificate validation unit 45 verifies to determine whether the CRL issued by the issuer of the certificate selected at step S4001 is present in the CRL holding unit 47. When it is absent in the CRL holding unit 47 (i.e., if No at step S4006), the certificate validation unit 45 gives access to the location of revoked list distribution point recited in the certificate to thereby acquire the latest version of CRL (at step S4007). Then, the certificate validation unit 45 saves the acquired CRL in the CRL holding unit 47 (step S4008).

When the CRL issued by the issuer of the certificate selected at step S4001 is present in the CRL holding unit 47 (i.e., if Yes at step S4006), the certificate validation unit 45 acquires a corresponding CRL from the CRL holding unit 47 (step S4009).

Next, the certificate validation unit 45 validates the CRL that was acquired at either the step S4007 or step S4009 (at step S4010). Regarding the CRL validation processing at step S4010, a detailed explanation will be given later with reference to FIG. 19.

In case the CRL validation processing is succeeded at step S4010, the certificate validation unit 45 checks whether the CRL contains therein a serial number of the certificate as selected at step S4001 (at step S4011).

In the case of the "OCSP" answer being output at step S4005, the certificate validation unit 45 checks whether an OCSP response issued by the issuer of the certificate selected at step S4001 is present in the OCSP response holding unit 48. When no such response is found in the OCSP response holding unit 48 (i.e., if No at step S4012), the certificate validation unit 45 gives access to the location of OCSP responder recited in the certificate, thereby to acquire an OCSP response (at step S4013). Then, the certificate validation unit 45 saves this acquired OCSP response in the OCSP response holding unit 48 (step S4014).

When the OCSP response that was issued by the certificate selected at step S4001 is present in the OCSP response holding unit 48 (i.e., if Yes at step S4012), the certificate validation unit 45 acquires a corresponding OCSP response from the OCSP response holding unit 48 (at step S4015).

Next, the certificate validation unit 45 validates the OCSP response that was acquired at step S4013 or step S4015 (at step S4016). Regarding the OCSP response validation processing at step S4016, a detailed explanation of it will be given later with reference to FIG. 20.

When the OCSP response validation at step S4016 is completed successfully, the certificate validation unit 45 verifies a present status of the certificate as recited in the OCSP response (at step S4017).

In case it is verified that the serial number is found in CRL at step S4011 or, alternatively, in case the certificate status is set to being revoked or is kept unknown at step S4017, the certificate validation unit 45 judges that the certificate selected at step S4001 is not valid (i.e., the "No" determination at step S4018); then, proceed to step S4019.

When a revocation reason recited in either the CRL or the OCSP response is not CA compromise (i.e., if No at step S4019), the certificate validation unit 45 goes next to step S4021.

When the revocation reason recited in the CRL or the OCSP response is CA compromise (i.e., if Yes at step S4019), the certificate validation unit 45 notifies the certificate update unit 44 of both the issuer's name of the certificate selected at step S4001 and the occurrence of CA compromise (at step S4020), and then prepares an error report specifying the type of an error-occurred certificate and indicating that the cause of the error of the validation processing is inclusion of a revoked certificate (step S4021).

When it is ascertained that there is no serial numbers in the CRL at step S4011 or, alternatively, when the certificate status is verified to be valid at step S4017, the certificate validation unit 45 judges that the certificate selected at step S4001 is valid (the "Yes" determination at step S4018).

In case the selected certificate is not EE certificate (i.e., if No at step S4022), the certificate validation unit 45 returns to the step S4001. Alternatively, when the selected certificate is EE certificate (if Yes at step S4022), the certificate validation unit 45 prepares a normal termination notice with the validation result being effective (at step S4023).

Figure 19:
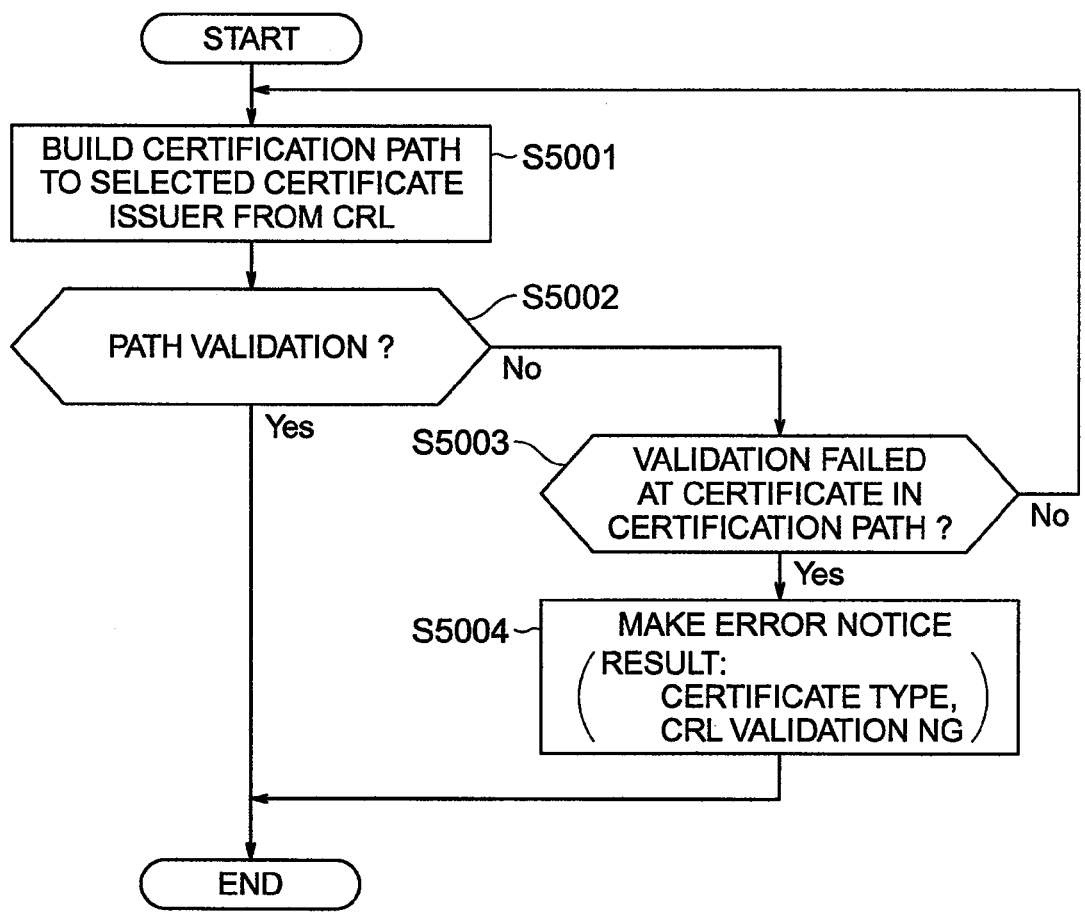
FIG. 19 is a flowchart showing details of CRL validation processing (step S4010 in FIG. 17) to be performed by the certificate validation unit 45.

FIG. 19 is a flowchart showing in detail the CRL validation processing (step S4010 in FIG. 17) to be performed by the certificate validation unit 45.

The certificate validation unit 45 builds a certification path up to the issuer of the certificate selected at step S4001 from the CRL acquired at step S4007 or step S4009 (at step S5001). This certification path building processing is similar to that shown in FIGS. 14 and 15. Next, the certificate validation unit 45 performs certification path validation: if this validation is failed (i.e., if No at step S5002), then proceed to step S5003; if the certification path validation is succeeded (if Yes at step S5002) then quit the CRL validation processing.

In case the path validation is failed at any one of those certificates along the certification path (i.e., if No at step S5003), the certificate validation unit 45 returns at step S5001, followed by repeated execution of the certification path building processing. When the validation is failed at one of the certificates in the certification path (i.e., if Yes at step S5003), the certificate validation unit 45 prepares an error notice specifying the type of such error-occurred certificate while letting the cause of the error of validation processing be the revoked CRL validation inexecutability (at step S5004).

Figure 20:
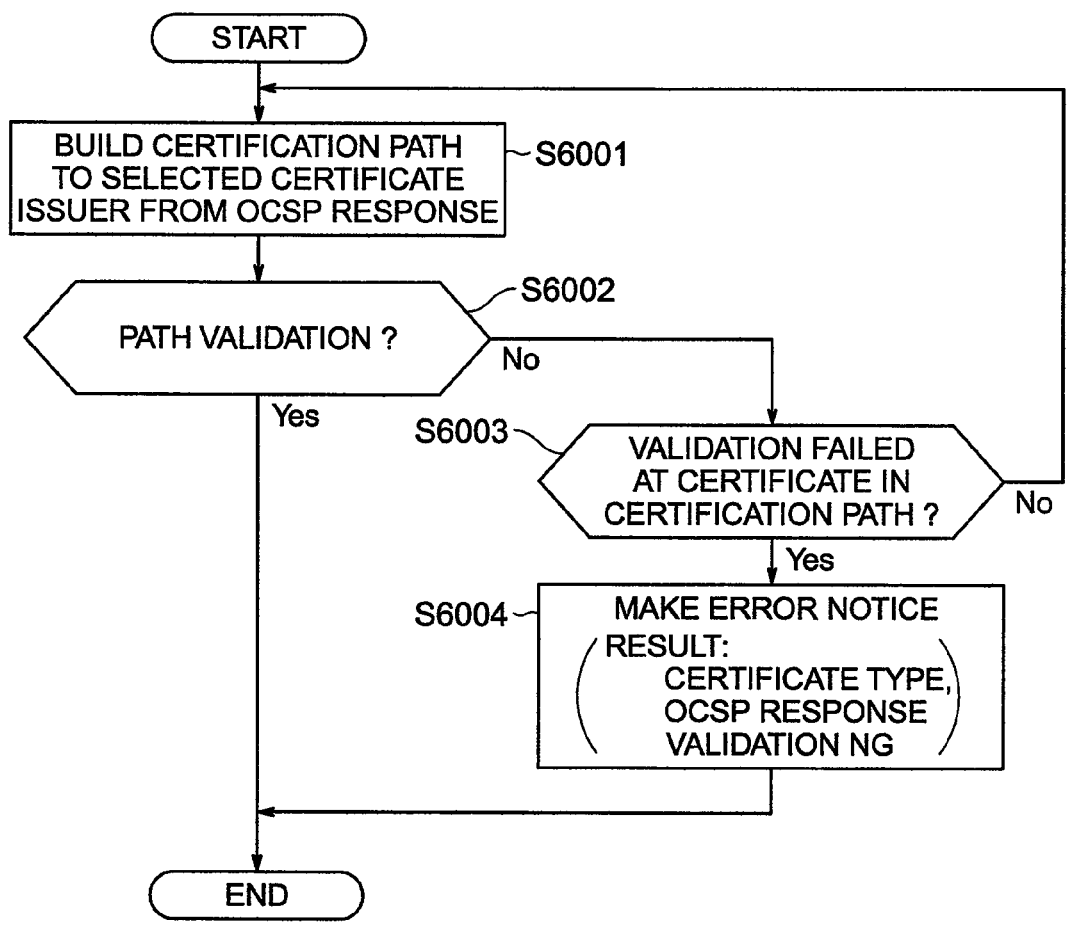
FIG. 20 is a flowchart showing details of OCSP response validation processing (step S4016 of FIG. 18) to be performed by the certificate validation unit 45.

FIG. 20 is a flowchart showing in detail the OCSP response validation processing (step S4016 of FIG. 18) which is performed by the certificate validation unit 45.

The certificate validation unit 45 builds a certification path leading to the issuer of the certificate selected at step S4001 from the OCSP response acquired at step S4013 or step S4015 (at step S6001). Details of the certification path building processing are shown in FIGS. 14 and 15. Next, the certificate validation unit 45 performs certification path validation: if this validation is failed (i.e., if No at step S6002), then go to step S6003; if the certification path validation is completed successfully (i.e., Yes at step S6002) then finish the OCSP response validation processing.

In case the path validation is failed at any one of those certificates in the certification path (i.e., if No at step S6003), the certificate validation unit 45 returns to the step S6001, followed by repeated execution of the certification path building processing. When the validation is failed at one of the certificates in the certification path (i.e., if Yes at step S6003), the certificate validation unit 45 creates an error notice specifying the type of such error-occurred certificate while letting the cause of the error of validation processing be the revoked CRL validation inexecutability (at step S6004).

Figure 21:
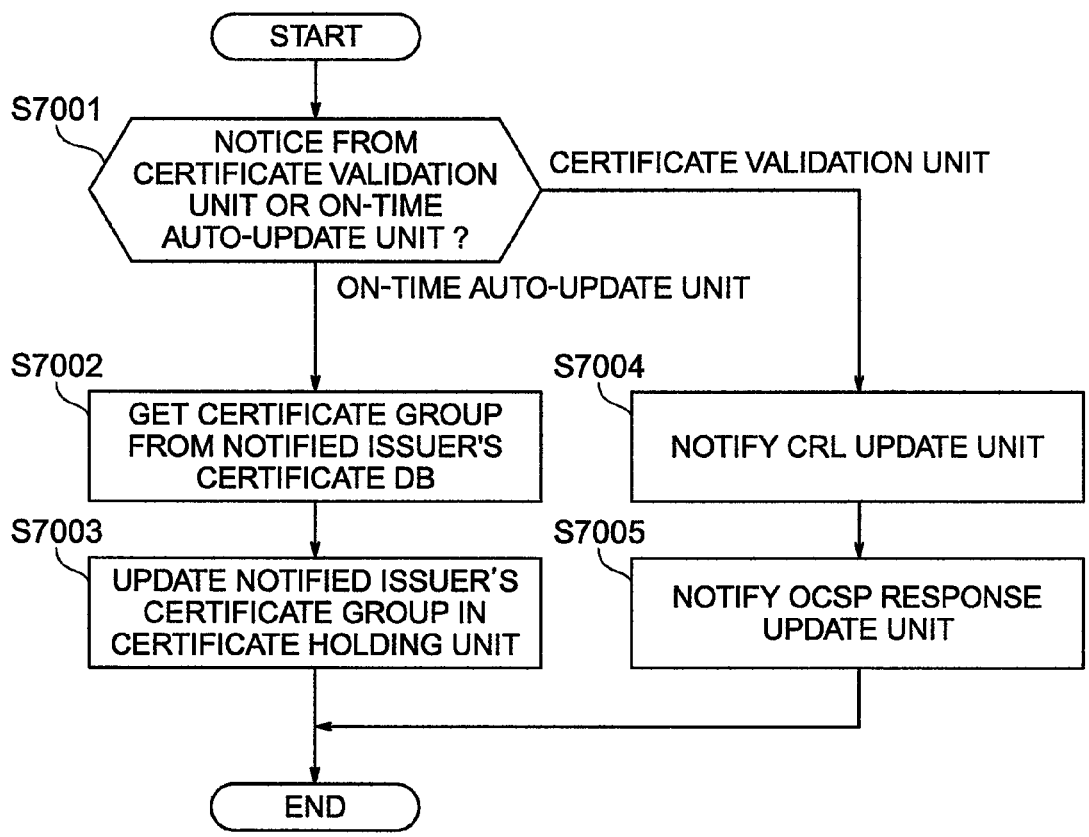
FIG. 21 is a flowchart of the processing for updating the certificate holding unit 49, which is performed by the certificate update unit 44.

FIG. 21 is a flowchart of the update processing of the certificate holding unit 49, which is performed by the certificate update unit 44.

Upon receipt of an update notice from the periodic auto-update unit 41 (i.e., the "periodic auto-update unit" determination at step S7001), the certificate update unit 44 gives access to the certificate DB 34 of a CA 12 that corresponds to the issuer recited in the update notice to thereby acquire a certificate group (at step S7002). The certificate update unit 44 saves the acquired certificate group in the certificate holding unit 49 and updates the certificate group (step S7003).

When receiving an update notice from the certificate validation unit 45 (the "certificate validation unit" determination at step S7001), the certificate update unit 44 sends to the CRL update unit 42 a request for updating the CRL issued by an issuer as recited in the update notice from the certificate validation unit 45 (at step S7004). Next, the certificate update unit 44 sends to the OCSP response update unit 43 a request for updating the OCSP response issued by the issuer as recited in the update notice from the certificate validation unit 45 (at step S7005).

Figure 22:
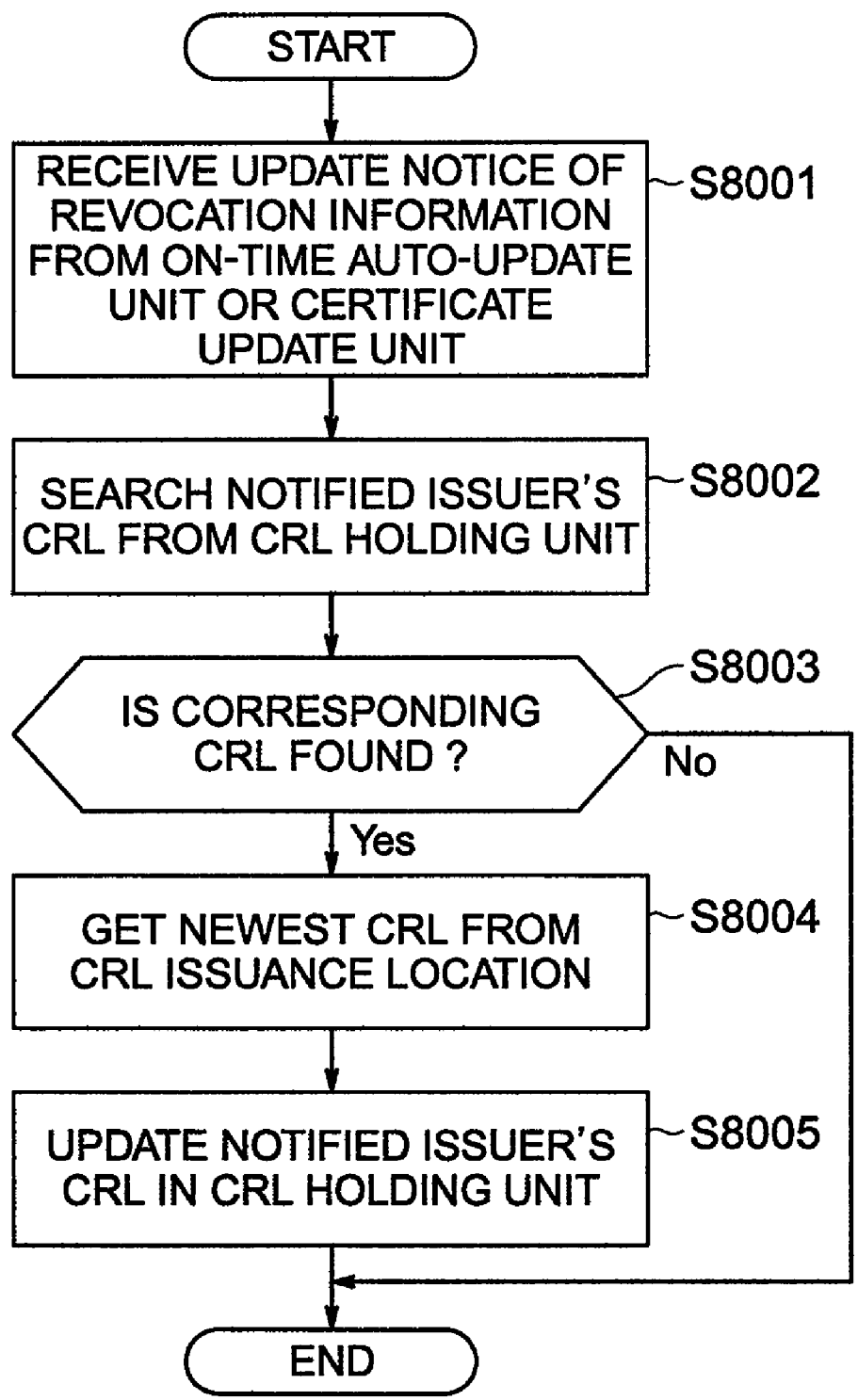
FIG. 22 is a flowchart of the processing for updating the CRL holding unit 47, which is performed by the CRL update unit 42.

FIG. 22 is a flowchart of the update processing of the CRL holding unit 47, which is performed by the CRL update unit 42.

The CRL update unit 42 receives a CRL update notice from either the periodic auto-update unit 41 or the certificate update unit 44 (at step S8001). The CRL update unit 42 searches the contents of the CRL holding unit 47 to extract therefrom the CRL of the issuer recited in the received CRL update notice (at step S8002). In case there is the CRL of a corresponding issuer (i.e., if Yes at step S8003), an attempt is made to acquire the latest version of CRL from a CRL-issuing location (at step S8004). Next, the CRL update unit 42 stores the acquired CRL in the CRL holding unit 47, and updates the CRL holding unit 47 (at step S8005). Note here that at step S8003, when the corresponding issuer's CRL is absent, the CRL update unit 42 quits the update processing.

Figure 23:
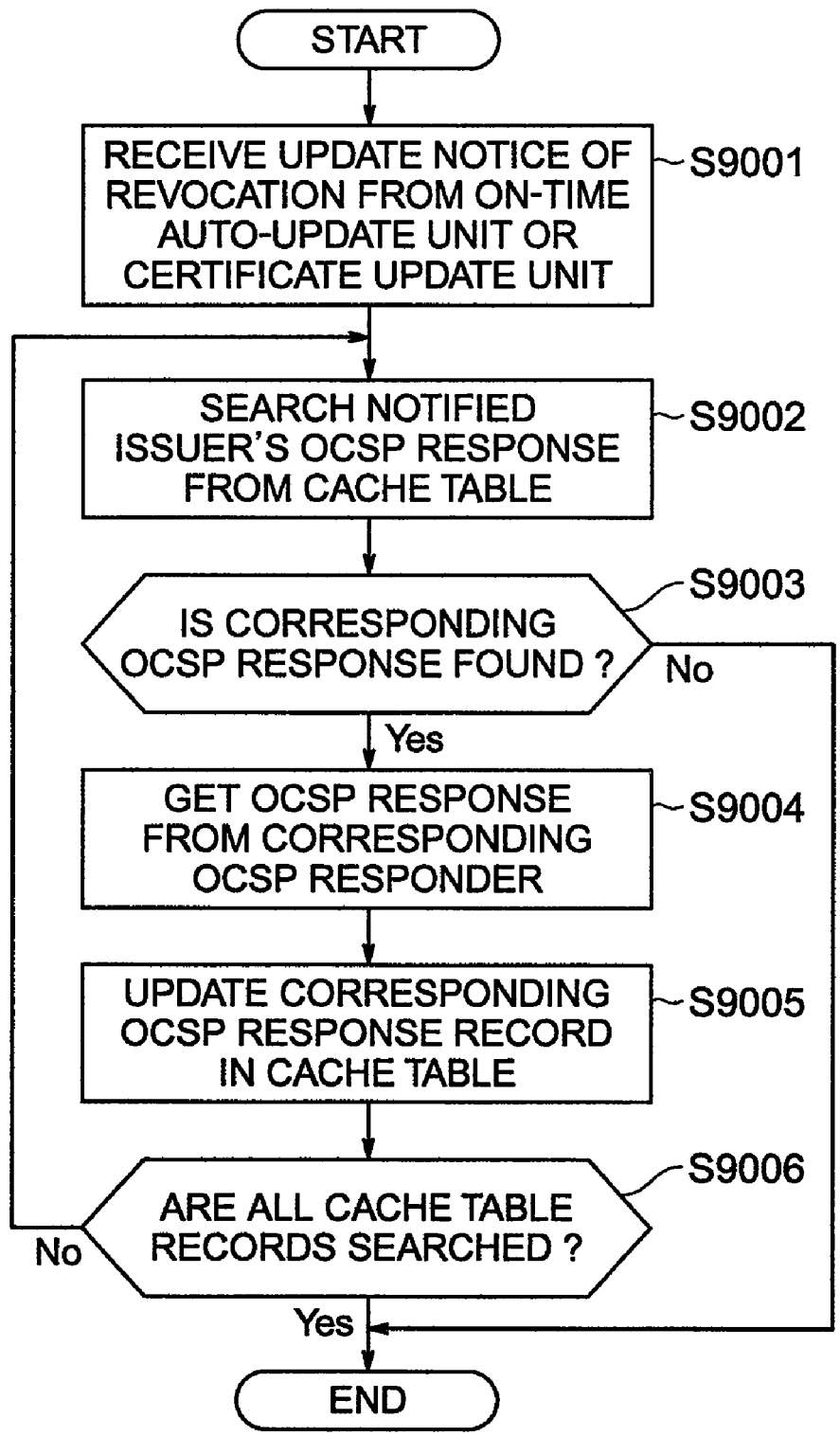
FIG. 23 is a flowchart of the processing for updating the OCSP response holding unit 48, which is performed by the OCSP response update unit 43.

FIG. 23 is a flowchart of the processing for updating the OCSP response holding unit 48, which is performed by the OCSP response update unit 43.

The OCSP response update unit 43 receives an OCSP response update notice from either the periodic auto-update unit 41 or the certificate update unit 44 (at step S9001). The OCSP response update unit 43 searches the contents of a cache table of the OCSP response holding unit 48 to extract therefrom an OCSP response of an issuer recited in the OCSP response update notice (at step S9002). When a corresponding issuer's OCSP response is present (i.e., if No at step S9003), the OCSP response update unit 43 sends an OCSP request of a certificate corresponding to an OCSP response-issuing location and acquires an OCSP response (at step S9004). The OCSP response update unit 43 stores this acquired OCSP response in the cache table of the OCSP response holding unit 48 and updates the OCSP response holding unit 48 (at step S9005). The OCSP response update unit 43 checks whether every record of the cache table has been searched: if the search processing is completed up to the last record, then quit the update processing; if the search processing is not completed up to the last record (i.e., if No at step S9006) then return to the step S9002. Note that at step S9003, when the corresponding issuer's OCSP response is absent, the OCSP response update unit 43 quits the update processing.

One preferred embodiment of this invention has been described. The certificate validation server 13 has a certificate validation means operatively responsive to receipt of a certificate validation request from a terminal device 11, for performing certification path building processing by use of a certificate of CA trusted by the terminal and a certificate of a target object under testing for validation as contained in the certificate validation request as sent from the terminal device 11, and for performing certification path validation processing which verifies the validity of every certificate of a certification path using CRL and OCSP response to be provided from the CA 12, and for sending a result of the certificate validity judgment to the terminal as a certificate validation result. The certificate validation means is characterized in that it uses the CRL or the OCSP response being stored in the validation server 13 to perform the validation of a certification path and in that when the CRL or OCSP response is not stored, access is given to the CA 12 to thereby acquire the CRL or OCSP response. The certificate validation means is also characterized by using a CA certificate stored in the validation server 13 to perform the certification path building or CRL validation or OCSP response validation and by acquiring it by access to the CA 12 in cases where no CA certificates are stored therein. The certificate validation means is also characterized by detecting the CA 12's key update in the process of performing the certification path building, by detecting a CA compromise of the CA 12 in the process of certification path validation, and by updating the certificate stored in the validation server 13. The validation server 13 also includes a certificate storage means for storing therein CA certificates acquired by access to the repository of CA 12 in units of DNs of CA 12. The validation server 13 further includes a CRL storage means for storing CRLs acquired by access to the repository of CA 12 in units of DNs of CA 12. The validation server 13 further includes an OCSP response storage means for storing therein an OCSP response acquired from OCSP responder of CA 12 while at the same time calculating either a valid time period of the OCSP response which is set up per DN of CA 12 by a system operation/maintenance manager or the next-scheduled update time point from the valid time period for the purpose of categorization of certificate states (valid, invalid, unknown) on a per-CA 12 basis. The validation server 13 further includes an on-time automatic update means for notifying, when reaching a predetermined auto-update time as set up by the operation manager, update of the CRL being stored in the validation server 13 or, alternatively, update of the CA certificate stored in the validation server 13. This on-time auto-update means is characterized by notifying the update of an OCSP response stored in the validation server 13 upon reaching the next OCSP response update time stored in the validation server 13. The validation server 13 further includes a certificate update means responsive to receipt of a notice from any one of the on-time auto-update means and the certificate validation means, for acquiring a new CA certificate from the CA 12 and for updating the CA certificate stored. The certificate update means is characterized in that, when the key update of CA 12 and compromise of CA 12 are notified from the certificate validation means, the certificate update means notifies the CRL update means of the necessity of updating the CRL as stored in the validation server 13 and also notifies the OCSP response update means of the need to update the OCSP response stored in the validation server 13.

The validation server 13 further includes a CRL update means responsive to receipt of a notice from either the on-time auto-update means or the certificate update means, for acquiring a new CRL from the CA 12 and for updating the stored CRL. In addition, the validation server 13 has a CRL update means responsive to receipt of a notice from either the on-time auto-update means or the certificate update means, for acquiring a new OCSP response from the CA 12 and for updating the saved OCSP response.

According to the embodiment stated supra, it is possible to provide a certificate validation method capable of effectively performing certificate validation processing with increased security and also provide a validation server for implementation of the method along with a software program and storage media for storing therein this program. This makes it possible to effectively and safely perform the building of a certification path and validation of the certification path in the certificate validation processing.

Also note that this invention should not exclusively be limited to the above-stated illustrative embodiment and may alternatively be modified and altered without departing from the spirit and scope of the invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A certificate validation method for validating a certificate in a certificate validation server connected to a plurality of terminal devices and a plurality of certificate authorities according to a request from one of the plurality of the terminal devices, wherein said certificate validation server performs a processing operation comprising the steps of:
   acquiring and storing in a storage unit certificates of relevant certificate authorities among the plurality of certificate authorities, relevant first certificate status information and relevant second certificate status information;
   building a certification path and validating the certification path by use of the certificates of the relevant certificate authorities, the relevant first certificate status information and the relevant second certificate status information stored in said storage unit;
   detecting a key update of a given certificate authority of the relevant certificate authorities during the building of the certification path and updating the certificates of the relevant certificate authorities, the relevant first certificate status information and the relevant second certificate status information; and
   detecting compromise of the given certificate authority during the validation of the certification path and updating the certificates of the relevant certificate authorities, the relevant first certificate status information and the relevant second certificate status information, all of which is stored in the storage unit.

2. The certificate validation method according to claim 1, wherein the processing of said certificate validation server further comprises:
   periodically updating certificates of the relevant certificate authorities or the relevant first certificate status information or the relevant second certificate status information being stored in said storage unit.

3. The certificate validation method according to claim 2, wherein said first certificate status information is certificate revocation list information whereas said second certificate status information is online certificate status protocol ("OCSP") response information.

4. The certificate validation method according to claim 1, wherein said storage unit stores therein information indicating a registration time point of the OCSP response information, a next update time point and cache usage criteria, and wherein the processing of said certificate validation server further comprises the steps of:
   calculating the next update time point of said OCSP response information based on the cache usage criteria of said OCSP response information and the registration time point of said OCSP response information; and
   updating a corresponding next update time point of corresponding response information being stored in said storage unit.

5. The certificate validation method according to claim 4, wherein the cache usage criteria of said OCSP response information is under management per certificate authority and per certificate relating thereto.

6. A certificate validation server connected to a plurality of terminal devices and a plurality of certificate authorities, for validating a certificate according to a request from one of the plurality of the terminal devices, wherein said certificate validation server comprises:
   a central processing unit (CPU); and
   a storage unit,
   wherein the CPU is configured to:
      acquire and store in the storage unit certificates of relevant certificate authorities, relevant first certificate status information and relevant second certificate status information;
      build a certification path and validate the certification path by use of the certificates of the relevant certificate authorities, the relevant first certificate status information and the relevant second certificate status information stored in said storage unit;
      detect a key update of a given certificate authority of the relevant certificate authorities during the building of the certification path and update the certificates of the relevant certificate authorities, the relevant first certificate status information and the relevant second certificate status information; and
      detect compromise of the given certificate authority during the validation of the certification path and update the certificates of the relevant certificate authorities, the relevant first certificate status information and the relevant second certificate status information, all of which is stored in the storage unit.

7. The certificate validation server according to claim 6, wherein said information processing unit is further operative to periodically update certificates of the relevant certificate authorities or the relevant first certificate status information or the relevant second certificate status information being stored in said storage unit.

8. The certificate validation server according to claim 7, wherein said first certificate status information is certificate revocation list information whereas said second certificate status information is online certificate status protocol ("OCSP") response information.

9. The certificate validation server according to claim 6, wherein said storage unit stores therein information indicating a registration time point of the OCSP response information, a next update time point and cache usage criteria, and wherein said information processing unit calculates the next update time point of said OCSP response information based on the cache usage criteria of said OCSP response information and the registration time point of said OCSP response information, and updates a corresponding next update time point of corresponding response information being stored in said storage unit.

10. The certificate validation server according to claim 9, wherein the cache usage criteria of said OCSP response information is under management per certificate authority and per certificate relating thereto.

11. A non-transitory computer-readable storage medium having stored thereon a computer-executable program to be used in a computer connected via a network with a plurality of terminal devices and a plurality of certificate authority entities, for causing the computer to execute certificate validation processing according to a request from one of the plurality of the terminal devices, wherein said program causes said computer to perform, in the certificate validation processing, an operation comprising the steps of:
  acquiring and storing in a storage unit certificates of relevant certificate authorities, relevant first certificate status information and relevant second certificate status information;
  building a certification path and validating the certification path by use of the certificates of the relevant certificate authorities, the relevant first certificate status information and the relevant second certificate status information stored in said storage unit;
  detecting a key update of a given certificate authority of the relevant certificate authorities during the building of the certification path and updating the certificates of the relevant certificate authorities, the relevant first certificate status information and the relevant second certificate status information; and
  detecting compromise of the given certificate authority during the validation of the certification path and updating the certificates of the relevant certificate authorities, the relevant first certificate status information and the relevant second certificate status information, all of which is stored in the storage unit.

12. The computer-readable storage medium having stored thereon computer-executable program according to claim 11, wherein said program causes said computer to periodically update certificates of the relevant certificate authorities or the relevant first certificate status information or the relevant second certificate status information being stored in said storage unit.

13. The computer-readable storage medium having stored thereon computer-executable program according to claim 12, wherein said first certificate status information is certificate revocation list information whereas said second certificate status information is online certificate status protocol (OCSP) response information.

14. The computer-readable storage medium having stored thereon computer-executable program according to claim 11, wherein said storage unit stores therein information indicating a registration time point of the OCSP response information, a next update time point and cache usage criteria, and wherein said program causes said computer to calculate the next update time point of said OCSP response information based on the cache usage criteria of said OCSP response information and the registration time point of said OCSP response information, and update a corresponding next update time point of corresponding response information being stored in said storage unit.

15. The computer-readable storage medium having stored thereon computer-executable program according to claim 14, wherein the cache usage criteria of said OCSP response information is under management per certificate authority and per certificate relating thereto.

* * * * *